US006922721B1

(12) United States Patent
Minborg et al.

(10) Patent No.: US 6,922,721 B1
(45) Date of Patent: Jul. 26, 2005

(54) EXCHANGE OF INFORMATION IN A COMMUNICATION SYSTEM

(75) Inventors: Per-Åke Minborg, Stora Höga (SE); Lars Mats Jonas Minborg, Göteborg (SE); Timo Pohjanvuori, Göteborg (SE); Nils Thomas Babtist Larsson, Ekerö (SE)

(73) Assignee: The PhonePages of Sweden AB, Göteborg (SE)

( * ) Notice: Subject to any disclaimer, the term of this patent is extended or adjusted under 35 U.S.C. 154(b) by 533 days.

(21) Appl. No.: 09/686,990

(22) Filed: Oct. 17, 2000

(51) Int. Cl.[7] .............................................. G06F 15/16
(52) U.S. Cl. ...................... 709/219; 709/217; 455/405; 455/415; 455/566; 348/14.01; 379/202.01
(58) Field of Search ................................ 709/217, 219, 709/227, 229; 455/405, 414, 415, 422, 456, 461, 466, 566, 567, 433, 440, 412; 379/202.01, 215; 348/14.01, 14.02

(56) References Cited

U.S. PATENT DOCUMENTS 5,157,710 A    10/1992  Itoh
5,329,591 A     7/1994  Magrill
5,398,279 A     3/1995  Frain (Continued)

FOREIGN PATENT DOCUMENTS

DE       19737126        3/1999
EP       484 067 A2     10/1991
EP       0851647         7/1998

(Continued)

OTHER PUBLICATIONS

PCT–International Search Report for PCT/SE01/00071.
PCT–International Search Report for PCT/SE01/00080.
ETSI TS 101 267 (V.8.5.0) Technical Specification for (Continued)

*Primary Examiner*—Ario Etienne
*Assistant Examiner*—LaShonda Jacobs
(74) *Attorney, Agent, or Firm*—Hunton & Williams LLP

(57) ABSTRACT

A technique for supplying a data object to a user of a communication system includes: (a) creating a data object intended for rendering at a first communication device (e.g., a subscriber's communication device), the rendering to take place upon the occurrence of a triggering communication event, the data object providing information pertaining to a user of a second communication device (e.g., a "holder's communication device); (b) storing the data object in a data server; (c) transferring, in a first transferring step, the data object from the data server to the second communication device (e.g., the holder's communication device); (d) transferring, in a second transferring step, the data object from the second communication device to the first communication device (e.g., the subscriber's communication device); (e) determining whether the triggering communication event has occurred; and (f) rendering the data object at the first communication device (e.g., the subscriber's communication device) upon the occurrence of the communication event. In another embodiment, the data server may transfer the data object directly to the first communication device. A physical implementation of the above technique is also described.

55 Claims, 15 Drawing Sheets

U.S. PATENT DOCUMENTS

| | | |
|---|---|---|
| 5,561,704 A | 10/1996 | Salimando |
| 5,588,042 A | 12/1996 | Comer |
| 5,613,205 A | 3/1997 | Dufour |
| 5,633,922 A | 5/1997 | August et al. |
| 5,689,563 A | 11/1997 | Brown et al. |
| 5,712,979 A | 1/1998 | Graber et al. |
| 5,761,279 A | 6/1998 | Bierman et al. |
| 5,812,667 A | 9/1998 | Miki et al. |
| 5,812,950 A | 9/1998 | Tom |
| 5,840,433 A | 11/1998 | Juma |
| 5,850,433 A | 12/1998 | Rondeau |
| 5,878,347 A | 3/1999 | Joensuu et al. |
| 5,889,861 A | 3/1999 | Ohashi et al. |
| 5,893,031 A | 4/1999 | Hoogerwerf et al. |
| 5,920,815 A | 7/1999 | Akhavan |
| 5,930,699 A | 7/1999 | Bhatia |
| 5,933,486 A | 8/1999 | Norby et al. |
| 5,948,066 A | 9/1999 | Whalen et al. |
| 5,950,121 A | 9/1999 | Kaminsky et al. |
| 5,950,137 A | 9/1999 | Kim |
| 5,970,414 A | 10/1999 | Bi et al. |
| 5,999,806 A | 12/1999 | Kaplan et al. |
| 6,002,749 A | 12/1999 | Hansen et al. |
| 6,005,870 A | 12/1999 | Leung et al. |
| 6,006,097 A | 12/1999 | Hörnfeldt et al. |
| 6,009,091 A | 12/1999 | Stewart et al. |
| 6,014,090 A | 1/2000 | Rosen et al. |
| 6,016,349 A | 1/2000 | Musa |
| 6,047,174 A | 4/2000 | Frederick |
| 6,049,713 A | 4/2000 | Tran et al. |
| 6,058,301 A | 5/2000 | Daniels |
| 6,058,310 A | 5/2000 | Tokuyoshi |
| 6,064,887 A | 5/2000 | Kallioniemi et al. |
| 6,075,993 A | 6/2000 | Kawamoto |
| 6,081,705 A | 6/2000 | Houde et al. |
| 6,088,587 A | 7/2000 | Abbadessa |
| 6,088,598 A | 7/2000 | Marsolais |
| 6,091,808 A | 7/2000 | Wood et al. |
| 6,091,945 A | 7/2000 | Oka |
| 6,091,946 A | 7/2000 | Ahvenainen |
| 6,094,168 A | 7/2000 | Duffett-Smith et al. |
| 6,097,793 A | 8/2000 | Jandel |
| 6,097,942 A | 8/2000 | Laiho |
| 6,112,078 A | 8/2000 | Sormunen |
| 6,115,754 A | 9/2000 | Landgren |
| 6,134,450 A | 10/2000 | Nordeman |
| 6,138,158 A | 10/2000 | Boyle et al. |
| 6,141,413 A | 10/2000 | Waldner et al. |
| 6,154,646 A | 11/2000 | Tran et al. |
| 6,157,708 A | 12/2000 | Gordon |
| 6,161,008 A | 12/2000 | Lee et al. |
| 6,161,134 A | 12/2000 | Wang et al. |
| 6,163,598 A | 12/2000 | Moore |
| 6,169,897 B1 | 1/2001 | Kariya |
| 6,173,316 B1 | 1/2001 | De Boor et al. |
| 6,181,928 B1 | 1/2001 | Moon |
| 6,181,935 B1 | 1/2001 | Gossman et al. |
| 6,185,184 B1 | 2/2001 | Mattaway et al. |
| 6,192,123 B1 | 2/2001 | Grunsted et al. |
| 6,192,251 B1 | 2/2001 | Jyogataki et al. |
| 6,192,258 B1 | 2/2001 | Kamada et al. |
| 6,199,099 B1 | 3/2001 | Gershman et al. |
| 6,202,023 B1 | 3/2001 | Hancock et al. |
| 6,205,204 B1 | 3/2001 | Morganstein et al. |
| 6,208,659 B1 | 3/2001 | Govindarajan et al. |
| 6,215,790 B1 | 4/2001 | Voit et al. |
| 6,219,694 B1 | 4/2001 | Lazaridis et al. |
| 6,226,367 B1 * | 5/2001 | Smith et al. ............ 379/142.04 |
| 6,226,668 B1 | 5/2001 | Silverman |
| 6,233,608 B1 | 5/2001 | Laursen et al. |
| 6,243,443 B1 * | 6/2001 | Low et al. ............... 379/88.17 |
| 6,301,609 B1 * | 10/2001 | Aravamudan et al. ...... 709/207 |
| 6,356,956 B1 * | 3/2002 | Deo et al. .................... 719/318 |
| 6,469,998 B1 | 10/2002 | Sallinas et al. |
| 6,470,447 B1 | 10/2002 | Lambert et al. |
| 6,507,908 B1 | 1/2003 | Caronni |
| 6,522,875 B1 | 2/2003 | Dowling et al. |
| 6,549,773 B1 | 4/2003 | Linden et al. |
| 6,625,644 B1 | 9/2003 | Zaras |
| 6,687,340 B1 * | 2/2004 | Goldberg et al. ........ 379/88.14 |
| 6,744,759 B1 | 6/2004 | Sidhu et al. |
| 2002/0059272 A1 | 5/2002 | Porter |
| 2002/0068550 A1 | 6/2002 | Tejada |
| 2002/0128002 A1 | 9/2002 | Vu |
| 2003/0050052 A1 | 3/2003 | Minborg et al. |
| 2003/0060211 A1 | 3/2003 | Chern et al. |

FOREIGN PATENT DOCUMENTS

| | | |
|---|---|---|
| EP | 0 853 287 A2 | 7/1998 |
| EP | 0858202 | 8/1998 |
| EP | 0 869 688 A2 | 10/1998 |
| EP | 0944203 | 9/1999 |
| EP | 1069789 | 1/2001 |
| EP | 1089519 | 4/2001 |
| GB | 2 338 150 A | 8/1999 |
| WO | 94/23523 | 10/1994 |
| WO | WO 97/07644 | 2/1997 |
| WO | WO 97/13380 | 4/1997 |
| WO | WO/20441 | 6/1997 |
| WO | WO 97/22211 | 6/1997 |
| WO | WO 97/22212 | 6/1997 |
| WO | 97/31490 | 8/1997 |
| WO | 97/31491 | 8/1997 |
| WO | WO 97/31491 | 8/1997 |
| WO | 98/11744 | 3/1998 |
| WO | 98/18283 | 4/1998 |
| WO | 98/19445 | 5/1998 |
| WO | WO 98/51056 A2 | 11/1998 |
| WO | WO 98/56159 A1 | 12/1998 |
| WO | 98/56197 | 12/1998 |
| WO | 99/00751 | 1/1999 |
| WO | WO 99/00751 | 1/1999 |
| WO | WO 99/11078 | 3/1999 |
| WO | 99/35595 | 7/1999 |
| WO | 99/55107 | 10/1999 |
| WO | WO 00/04730 | 1/2000 |
| WO | WO 00/38458 | 6/2000 |
| WO | 00/39666 | 7/2000 |
| WO | 00/46697 | 8/2000 |
| WO | WO 00/77662 A2 | 12/2000 |
| WO | 00/78016 | 12/2000 |
| WO | 01/01077 | 1/2001 |
| WO | 01/20475 | 3/2001 |

OTHER PUBLICATIONS

Digital telecommunications system (Phase 2+); Specification of the SIM Application Toolkit for the Subscriber Identity Module—Mobile Equipment (SIM—ME) interface) (Global System for Mobile Communications: 1999).

International Search Report for PCT/SE00/01689, issued Dec. 8, 2000, four pages.

Schulzrinne, "A Comprehensive Multimedia Control Architecture for the Internet," Dept. of Computer Science, Columbia University, New York, NY, IEEE No. 0–7803–3799–9/97, 1997, pp. 65–76.

Schulzrinne and Rosenberg, "Signaling for Internet Telephony," Columbia University and Bell Laboratories, respectively, ten pages.

Lawrence Harte et al., GSM Superphones, Table of Contents and Chapter 1, pp. xi–xxii and 1–22, McGraw–Hill, 1999.

Christian Bettstetter et al., "GSM Phase 2+ General Packet Radio Service GPRS: Architecture, Protocols, and Air Interface," IEEE Communications Surveys, <<http://www.comsoc.org/pubs/surveys>>, 13 pages, Third Quarter 1999, vol. 2, No. 3.

Smart Messaging Specification, Revision 2.0.0, Nokia Mobile Phones Ltd., May 17, 1999.

Digital Cellular Telecommunications System (Phase 2); Technical Realization of the Short Message Service (SMS) Point–to–Point (GSM 03.40), ETSI, ETS 300 536, Fourth Edition, Oct. 1996.

Commonly Assigned U.S. Appl. No. 09/644,307, entitled "Method and Apparatus for Exchange of Information in a Communication System," filed Aug. 23, 2000 (and currently copending herewith).

* cited by examiner

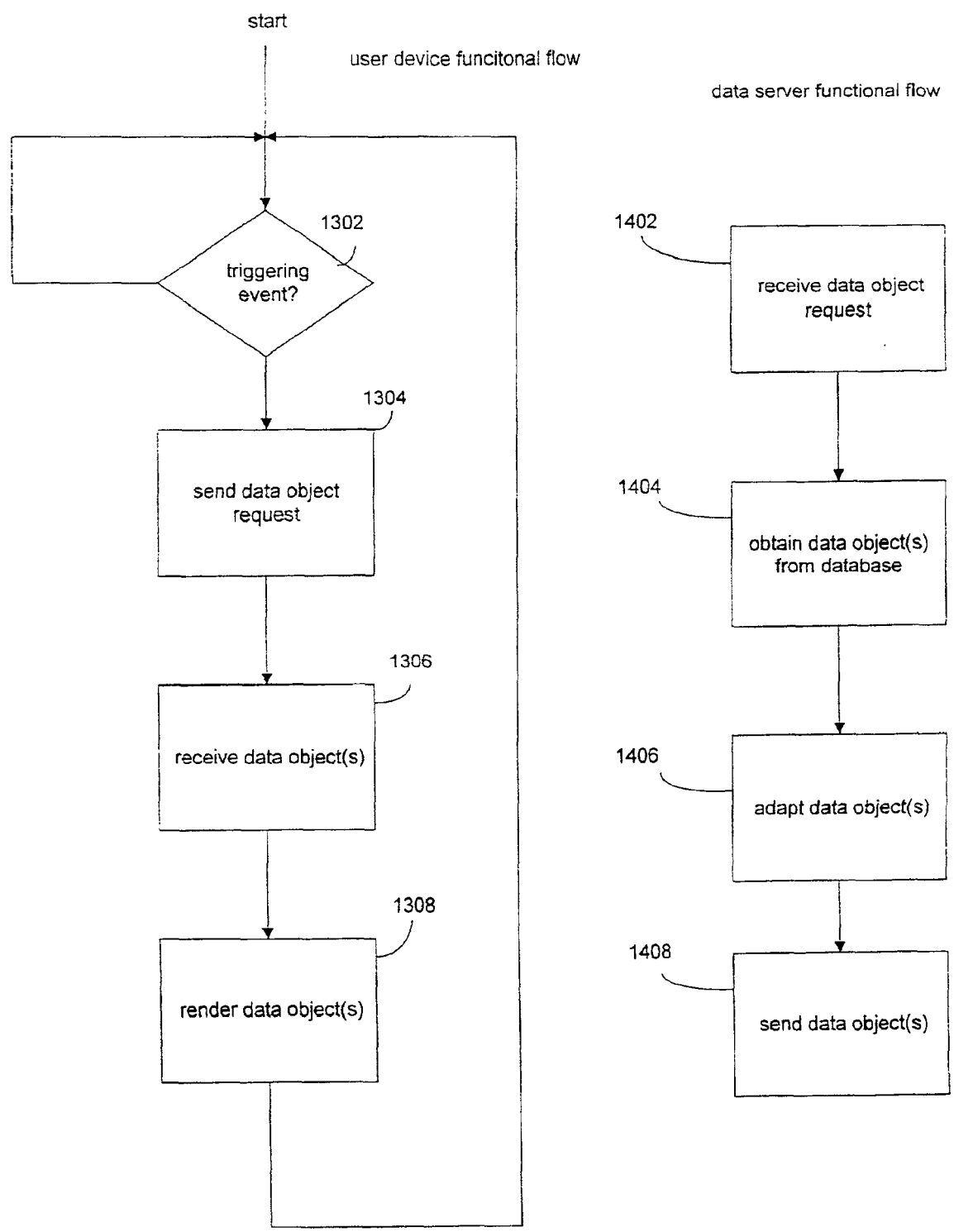
FIG. 13     FIG. 14

EXCHANGE OF INFORMATION IN A COMMUNICATION SYSTEM

CROSS REFERENCE TO RELATED APPLICATIONS

The present application is related to copending application Ser. No. 09/644,307 (the '307 application), entitled "Method and Apparatus for Exchange of Information in a Communication Network," and filed on Aug. 23, 2000, which is incorporated herein by reference in its entirety. The '307 application is based on provisional application 60/176,806, filed on Jan. 19, 2000, which is also incorporated herein by reference in its entirety.

BACKGROUND OF THE INVENTION

The present invention generally relates to the exchange of information in a communication system. More specifically, the present invention relates to a method and physical implementation (e.g., system, data server, communication device, etc.) for supplying a data object to a user device in a communication system. The present invention also relates to a method and physical implementation for receiving the data object. The present invention also relates to a method and physical implementation for rendering the data object. In a more particular embodiment, the present invention relates to a method and physical implementation for providing a data object to a mobile station in a mobile communication system, for receipt of the data object by the mobile station, and for rendering the data object at the mobile station.

Mobile communication systems and data packet networks (notably, the Internet) have both enjoyed significant success in recent years. Mobile communication systems deliver real-time voice communication between users in either analogue or digital formats (or in a hybrid format). One well known example of a mobile communication system is the Global System for Mobile Communication (GSM). This standard provides voice communication to its subscribers using circuit-switched communication technology. In this approach, the system allocates communication resources to a call for the entire duration of the call. On the other hand, the Internet primarily delivers digital information to users using data packet technology. In this approach, the system uses communication resources only during the periods in which data is being transmitted.

Efforts have long been underway to merge aspects of traditional mobile communication systems with data networks. The evolution of these efforts may be divided into a number of stages, or "generations." Namely, first generation (1 G) technology generally pertains to analog "voice-centric" services. Second generation (2 G) technology generally pertains to "voice-centric" digital communication services. Third generation (3 G) technology generally pertains to high speed broadband services with optional multimedia communication of voice, video, graphics, audio and other information. Further, 2.5 generation (2.5 G) technology generally pertains to high speed services having aspects of both 2 G and 3 G services. For instance, 2.5 G technology may utilize General Packet Radio Service (GPRS) systems or Enhanced Data Rates for Global Evolution (EDGE) systems.

For example, one known way of supplementing voice communication services with data delivery in a 2 G-technology context is through the Short Message Service (SMS). In the GSM standard, SMS messages can be transmitted over a Stand-alone Dedicated Control Channel (SDCCH). In operation, the communication system initially sends a message to a Mobile Switching Center (MSC). The message is then routed and stored in a Short Message Service Center (SMSC). The communication system then locates the addressed mobile station and alerts the mobile station that a message will be sent. The mobile station then tunes to the SDCCH channel that the system will use to send the message. The system then forwards the message to the mobile station and waits for acknowledgement of receipt by the mobile station. Additional detail regarding the GSM Short Message Service may be obtained from the publication "Digital Cellular Telecommunication System (Phase 2+), Technical Realization of the Short Message Service (SMS), Point-to-Point (PP)," GSM 03.40, version 5.4.0, ETSI, November, 1996 (accessible at http://www.etsi.org/).

The convention use of SMS messaging to convey information has drawbacks. Namely, SMS messages can be transmitted before, during, or after a voice communication session between users. However, the SMS messaging and voice communication session proceed in a largely independent fashion. Hence, the combination of these two modes of information delivery does not provide a strong sense of an integrated and interrelated multi-media presentation.

Another more advanced way of supplementing voice communication services with data delivery is through 2.5 G or 3 G technology that accommodates Internet browsing. These systems typically operate by converting Internet data objects to a format suitable for display at the mobile stations. More specifically, a gateway node is used to convert the data objects to a form which is compatible with the low transmission rates and small screen sizes typically used by mobile stations. The converted data objects are then sent to the mobile stations where they are rendered for the users' viewing. One markup language that can be used to facilitate the display of Internet data objects at the mobile stations is the Handheld Device Markup Language (HDML), which is modeled after the familiar Hypertext Markup Language (HTML).

These more advanced systems may also have drawbacks. Namely, a service provider may specifically "earmark" a service for use by a specific class of terminals (such as 2.5 G-compatible terminals). As such, consumers using "less advanced" technology may be barred from receiving the benefits of the service. This may have the undesirable effect of reducing the market potential of the service. In extreme cases, this may have the effect of preventing the service from "catching on" with consumers (e.g., by failing to popularize a service with a large body of current technology users).

There is therefore a general need to provide a more effective technique for combining voice communication services with supplementary data services.

SUMMARY OF THE INVENTION

The technique disclosed herein addresses the above need, as well as other needs. According to one embodiment, the technique comprises: (a) creating a data object intended for rendering at a first communication device (e.g., a subscriber's communication device), the rendering to take place upon the occurrence of a triggering communication event, the data object providing information pertaining to a user of a second communication device (e.g., a "holder's" communication device); (b) storing the data object in a data server; (c) transferring, in a first transferring step, the data object from the data server to the second communication device (e.g., the holder's communication device); (d) transferring, in a second transferring step, the data object from the second communication device to the first communication device (e.g., the subscriber's communication device); (e) determining whether the triggering event has occurred; and (f) rendering the data object at the first communication device (e.g., the subscriber's communication device) upon the occurrence of the communication event.

In another embodiment, the technique comprises the steps of: (a) creating a data object intended for rendering at a first communication device (e.g., a subscriber's communication device), the rendering to take place upon the occurrence of a triggering communication event, the data object providing information pertaining to a user of a second communication device (e.g., a "holder's" communication device); (b) storing the data object in a data server; (c) transferring the data object from the data server to the first communication device (e.g., the subscriber's communication device); (d) determining whether the triggering event has occurred; and (e) rendering the data object at the first communication device (e.g., the subscriber's communication device) upon the occurrence of communication event.

The disclosed invention also pertains to a physical implementation of the above-identified techniques. More specifically, the disclosed invention also pertains to a data server and user device for use in implementing the above identified techniques.

In one embodiment, data object transfer is performed using one or more of: (a) a data path used by a circuit-switched communication system; (b) a data path used by a packet-switched communication system; and/or (c) a data path used by a data-packet network.

In one embodiment, the data object comprises a variable portion and a non-variable portion. The transfer of data objects comprises transferring only the variable portion to the first and/or second communication devices.

The technique provides a number of benefits. For instance, the interrelationship of data object presentation and communication events enhances a user's communication session by adding a multi-media dimension to the communication session. Further, the technique for the delivery of data objects may be implemented using a wide variety of different types of communication systems, data networks and user devices, thus allowing current systems to use the techniques as well as more advanced systems. For instance, the technique can be used with at least 2 G, 2.5 G and 3 G communication technology. Thus, for instance, a user may continue to receive the benefits of the service in seamless fashion as he or she upgrades from one generation of technology to another. Other benefits will be apparent to those skilled in the art.

BRIEF DESCRIPTION OF THE DRAWINGS

The present invention can be understood more completely by reading the following Detailed Description of exemplary embodiments, in conjunction with the accompanying drawings, in which:

FIG. 13 shows an exemplary procedure for obtaining and rendering data objects at a user device, according to another embodiment;

FIG. 14 shows an exemplary procedure for receiving and processing requests for data objects at the data server, which complements the procedure of FIG. 13;

DETAILED DESCRIPTION OF THE INVENTION

1. System Features

The data object delivery technique is described with reference to specific types of communication systems, standards and protocols to facilitate explanation. More specifically, the data object delivery system is described with particular reference to the Global System for Mobile Communication (GSM). However, the technique can be implemented by other types of systems, standards (e.g., IS-136, IS-95, etc.) and protocols (e.g., TDMA, FDMA, CDMA, etc.).

Figure 1:
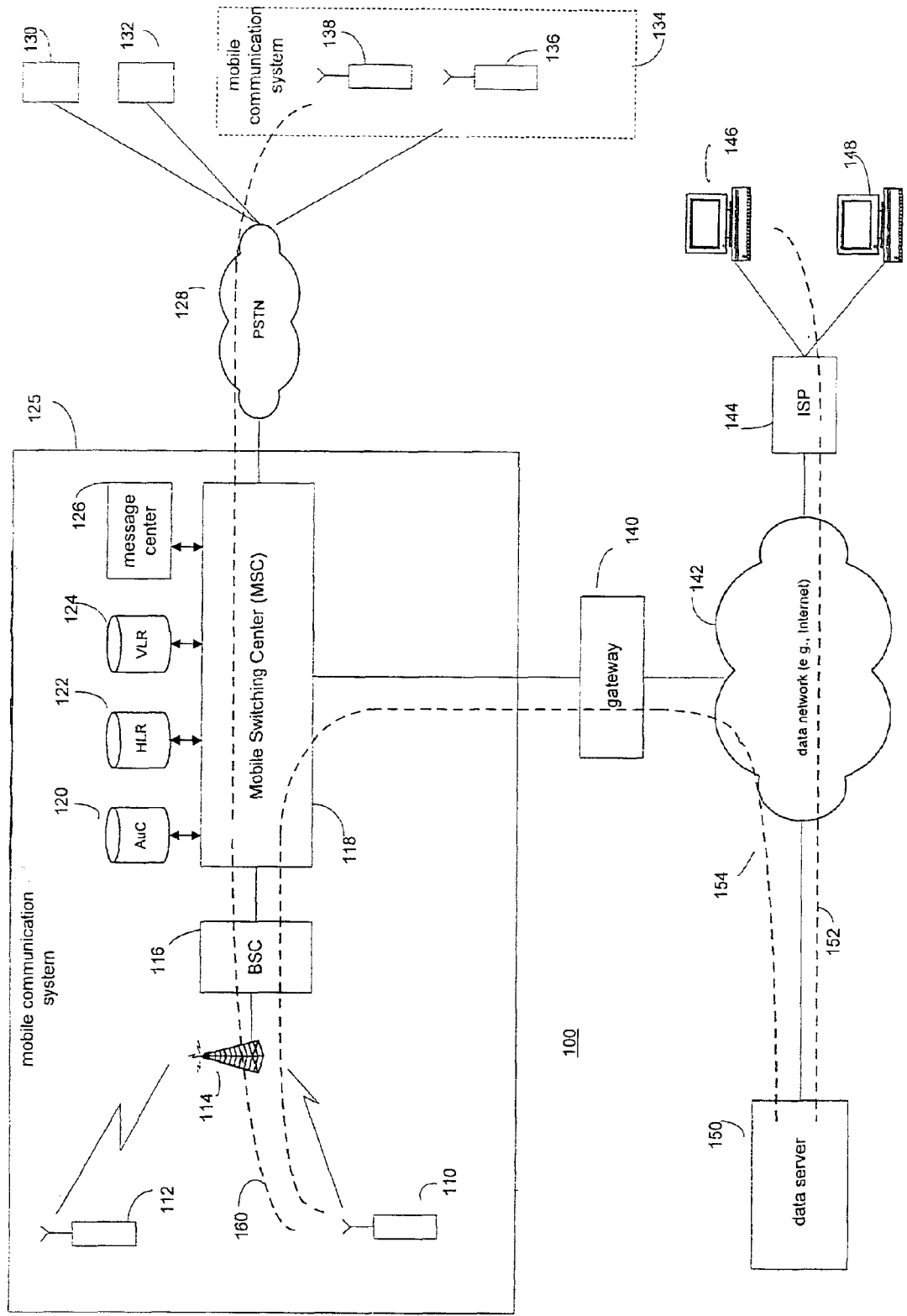
FIG. 1 shows an exemplary system for implementing the techniques described herein.

FIG. 1 illustrates an overview of a system 100 that can implement the technique. Referring to the top part of the figure, the system 100 includes a mobile communication system 125, e.g., based on the GSM architecture. The system 100 includes a Mobile Switching Center (MSC) 118 connected to a Base Station Controller (BSC) 116 and to a Public Switched Telephone Network (PSTN) 128. The BSC 116 provides communicative connection to plural user devices via base station 114. The user devices include exemplary mobile station devices 110 and 112. The PSTN 128 provides communicative connection to plural user devices 130 and 132. The user devices 130 and 132 can comprise any type of communication devices, such as "plain old telephones" (POTs), facsimile or data modem devices, etc. The PSTN 128 can also interface (directly or indirectly) with ISDN terminals and communication devices connected via a Digital Subscriber Line (DSL). The PSTN may also optionally connect to another mobile communication system 134, which may include plural user devices, such as mobile station devices 136 and 138.

The MSC 118 performs the switching necessary to interconnect calls between user devices using the communication system. The MSC 118 may be connected to a number of databases, such as authentication center (Auc) 120, Home Location Register (HLR) 122, and Visiting Location Register (VLR) 124. These databases are well known to those having skill in the art. Basically, the AuC 120 stores information that is used to validate the identity of user devices. The HLR 122 stores user profiles which indicate the services that the users have subscribed to, as well as other information. The VLR 124 stores information that identifies the user devices that are operating within the domain of the MSC 118. The AuC 120, HLR 122 and VLR 124 can be physically implemented as part of the MSC 118, or may be located remotely from the MSC 118. The message center 126, such as a Short Message Control Center (SMCC), receives, stores and forwards messages transmitted to and from the mobile communication system.

It will be apparent to those skilled in the art that the mobile communication system 125 may include additional user devices, base stations, BSCs, MSCs, etc. Further, the mobile communication system 125 may include additional functionality, nodes, databases, services, etc.

Referring now to the bottom part of the figure, the system 100 also includes a data network 142. The data network 142 may comprise, for instance, any network configured to transfer information in data packets. The data network 142 may comprise, for instance, an intranet, the Internet, a LAN (Local Area Network), etc. The data network 142 may use any type or combination of network enable code, such as Hypertext Markup Language (HTML), Dynamic HTML, Extensible Markup Language (XML), Extensible Stylesheet Language (XSL), etc. The data network may further be governed by any type or combination of protocols, such as the Transport Control Protocol (TCP), User Datagram Protocol (UDP), HyperText Transport Protocol (HTTP), Wireless Application Protocol (WAP), or other type of protocol.

A number of entities may interact with the data network 142. For instance, computer devices 146 and 148 are communicatively coupled with the data network 142 via Internet service provider 144 in a well known manner. Further, plural data servers are communicatively coupled with the data network 142, such as data server 150.

The data network 142 interfaces with the mobile communication system 125 via gateway 140. The gateway 140 broadly represents any platform for connecting the data network 142 with the mobile communication system 125. In one embodiment, the mobile communication system 125 allows for the exchange of data messages through the Short Messaging Service (SMS). In that case, the gateway 140 provides appropriate translation from the data network format (such the TCP/IP, HTTP, etc. protocol formats) to an SMS-compatible format (and vice versa for communication in the opposite direction).

The above-described SMS data path is "featured" in the following discussion to simplify and facilitate the explanation by providing one concrete implementation example. However, it should be recognized that the system 100 can use a variety of other techniques (besides the SMS data path) to transfer data between the data network 142 and the mobile communication system 125. For instance, the mobile communication system may allow for the exchange of data messages through a General Packet Radio Service (GPRS) link, or a variety of other types of links, systems, protocols, etc.

In an alternative embodiment, gateway functionality may be incorporated in other nodes of the system, such as at the server node.

Exemplary communication paths are illustrated in FIG. 1 with dashed lines. For instance, a party using user device 110 (referred to hereinafter as the "A-party") may achieve a real-time circuit-switched voice connection with a party using user device 138 (referred to hereinafter as the "B-party") via communication path 160. Further, the data server 150 may achieve a data connection with the A-party via data path 154. The data server 150 may achieve a similar data connection with the B-party via another data path (not shown). Further, a user using computer device 146 may achieve a data connection with data server 150 via data path 152.

Figure 2:
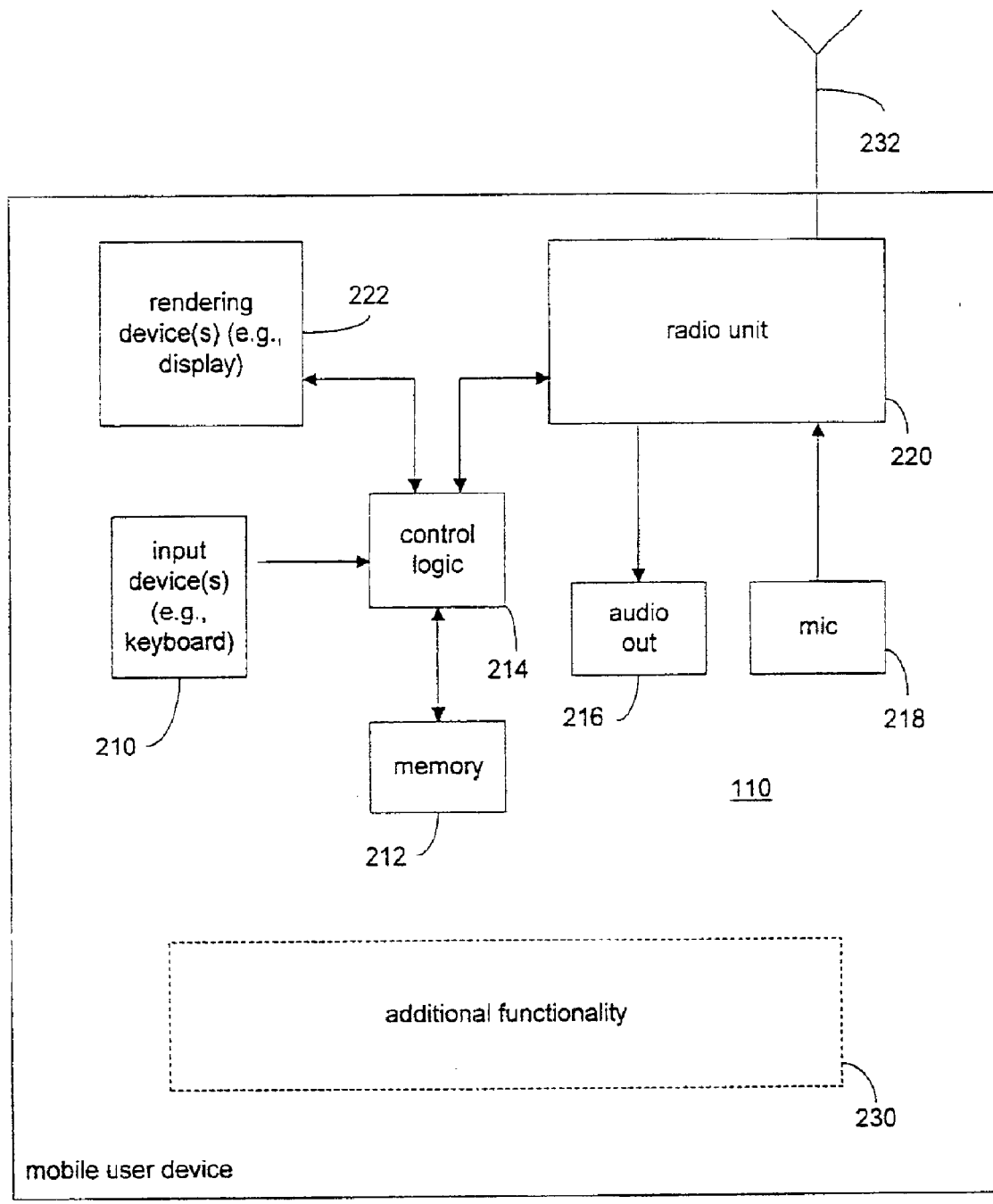
FIG. 2 shows an exemplary user device that can be used in the system of FIG. 1.

FIG. 2 shows one of the user devices, i.e., user device 110, which interfaces with mobile communication system 125. This user device 110 can comprise a mobile station user device (e.g., a mobile telephone), a Programmable Digital Assistant (PDA) with mobile station capabilities, or some other type of device. The user device 110 includes control logic 214 connected to at least one memory unit 212. The memory unit 212 may be non-volatile (e.g., EEPROM or SIM card) in order to retain stored information, should power be temporarily unavailable. The control logic 214 also connects to one or more input devices 210, such as a keyboard, touch screen, etc. The control logic 214 also connects to one or more rendering devices 222, such as a display, printer, etc. The control logic 214 also connects to a radio unit 220 that includes transmitter and receiver hardware (not shown) for transmitting and receiving signals over the air. The radio unit 220 connects to an antenna 232. The radio unit 220 also directly or indirectly connects to an audio output device 216 (such as a speaker and/or earphone) and a microphone 218 to enable voice communication.

The user device may further comprise additional functionality 230, e.g., as implemented by a plurality of programs. These programs may include a browser (not shown) that renders at least one type of data object to a user for viewing. The programs may also include an encryption/decryption engine (not shown) that encrypts data object requests and decrypts received data objects. The user device may optionally include cache memory (not shown) for storing and retrieving frequently used display objects, etc.

Other types of user devices can interface with system 100. For instance, another type of user device may comprise a fixed (non-mobile) telephone with graphic capabilities. Another type of user device may comprise a mobile station connected to a Personal Digital Assistance device (PDA) device (or similar device) via a communication link. The PDA includes functionality for displaying and manipulating the data objects.

The user device shown in FIG. 2 may embody any generation of technology, including 2 G, 2.5 G, 3 G, etc. technology.

Figure 3:
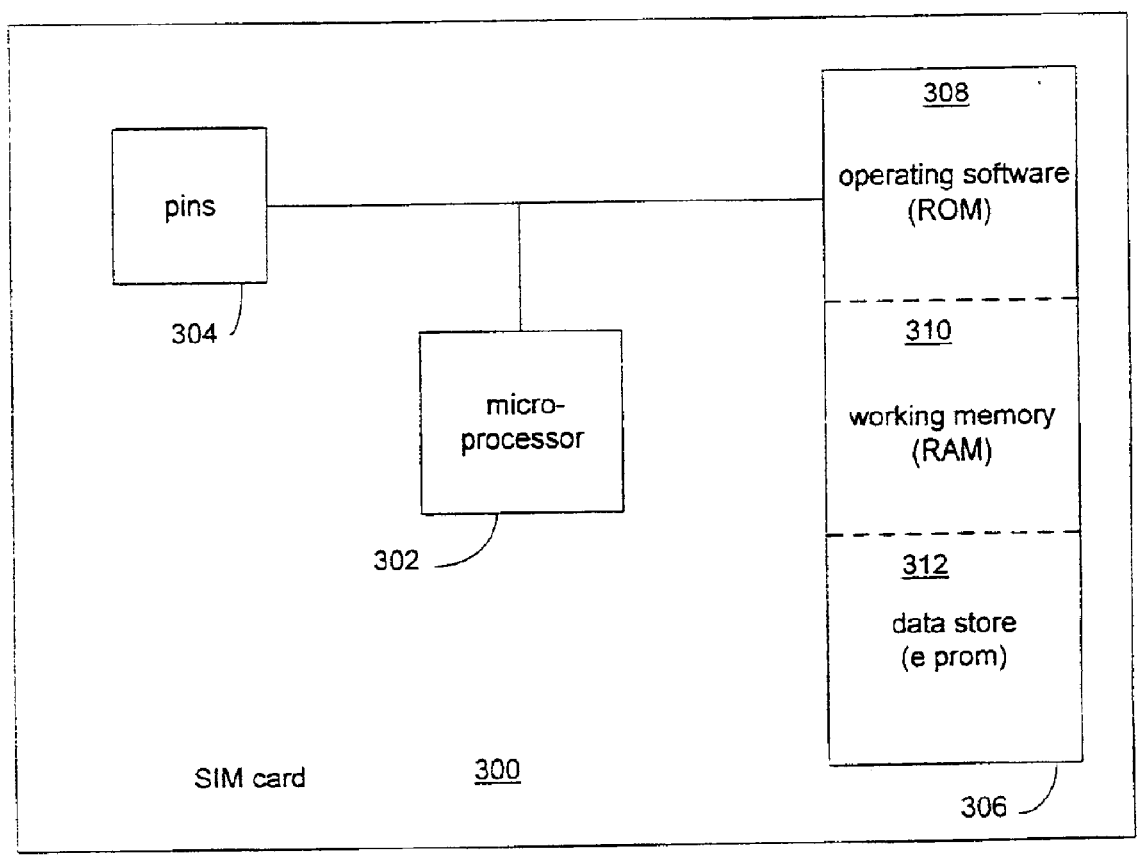
FIG. 3 shows an exemplary Subscriber Identification Module (SIM) card that can be used in the user device of FIG. 2.

The user device 110 shown in FIG. 2 may interface with the Subscriber Identification Module (SIM) card 300 shown in FIG. 3. The SIM card 300 stores subscription information that identifies the subscriber, such as the subscriber's telephone number, a unique identification number, and home system identification information. The unique identification number for a GSM subscriber may include an Integrated Mobile Station Identifier (IMSI) number.

As shown in FIG. 3, an exemplary SIM card 300 includes a microprocessor 302 coupled to memory 306 and input/output pins 304. The memory 306, in turn, includes operating software storage 308 (e.g., implemented as ROM memory), working memory 310 (e.g., implemented as RAM memory), and data store 312 (e.g., implemented as e-prom memory).

Figure 4:
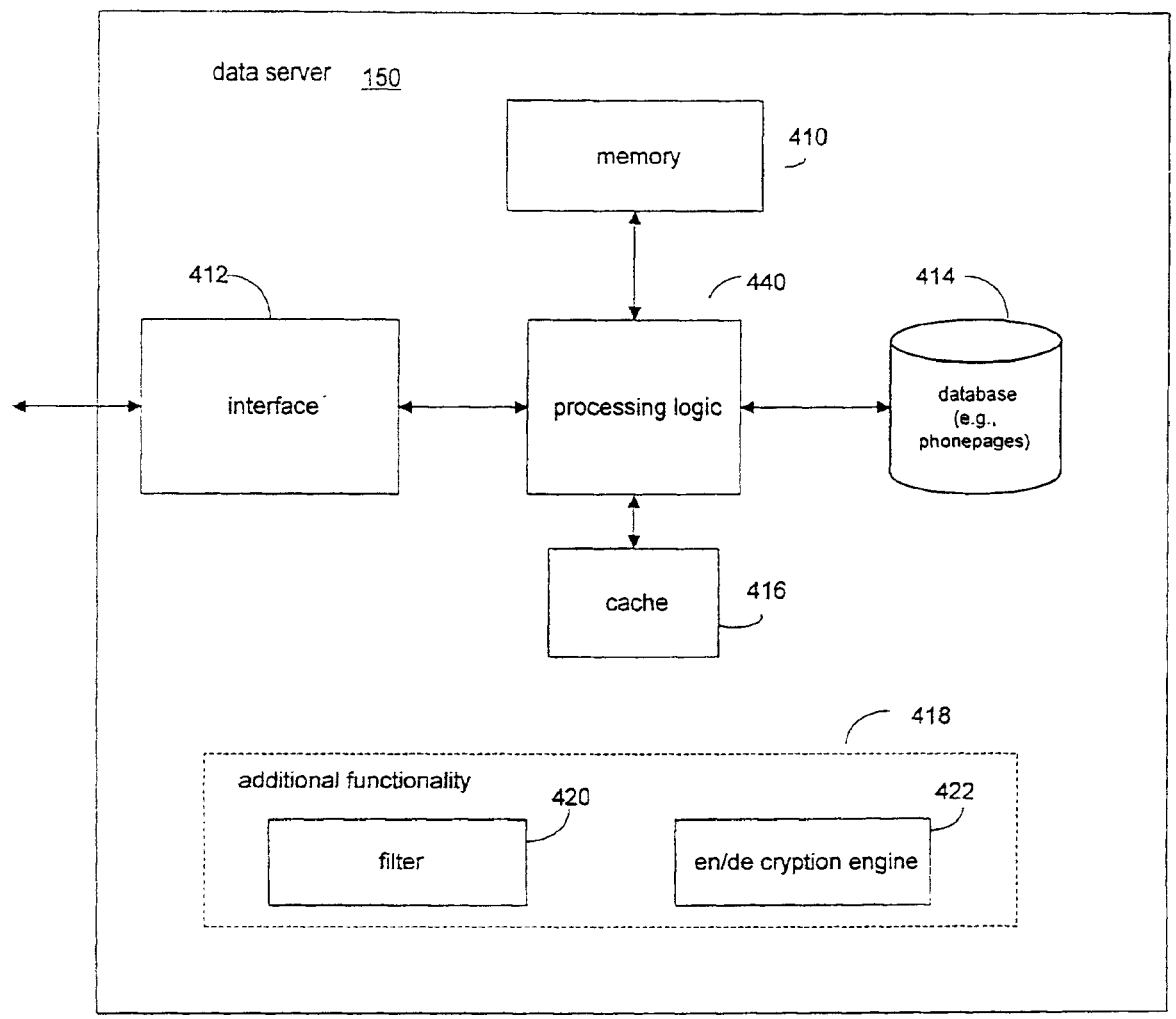
FIG. 4 shows an exemplary data server for use in the system of FIG. 1.

FIG. 4 identifies exemplary features of the data server 150. The server 150 includes at least one processing logic unit 440 (e.g., CPU) connected to at least one memory device 410, a cache memory 416, at least one database 414, and at least one communication interface 412. Memory device 410 and databases 414 can be non-volatile. The interface 412 allows the processing logic 440 to send and receive data to/from the data network 142. The cache memory 416 allows storage of frequently used data objects so that the processing logic unit 440 may obtain them in an efficient manner. The database 414 contains the actual data objects that can be displayed at the user devices via the communication infrastructure of system 100.

The data server 150 may also comprise a number of programs 418. The programs 418 can include a filter 420 allowing the data objects to be optimized according to the rendering capabilities of the user devices. The programs 418 may also include an encryption/decryption engine 422 allowing data object requests to be decrypted and data objects to be encrypted.

According to a variation, various modules of the data server 150 can be implemented as separate computers. The separate computers (not shown) may be located together in one facility or located remotely from each other.

The database 414 can be implemented by any type of storage media. For instance, it can comprise a hard-drive, RAM memory, magnetic media (e.g., discs, tape), optical media, printed media (e.g., lists), etc. The database 414 can be formed using any type of organization, such as relational, object-oriented, etc. The database 414 can be separated into two or more databases in a distributed fashion. Further, the database (or databases) 414 may contain redundant data. Any node in system 100 can access the database (or databases) 414, including internal nodes (e.g., access points internal to the data server system) or external nodes (e.g., access points external to the data server system). Thus, the database 414 is intended to very generally represent any type of means of retaining data objects.

The term "data objects" likewise is meant to connote a wide variety of information. It may refer to any type of audio information, textual information, graphic information, video information, or other types of information, or any combination of such types. The data objects are alternatively referred to as "phonepages" in the following discussion. In one particular embodiment, the data objects pertain to information which may be rendered at appropriate user devices upon the occurrence of events within the mobile communication system 125. In alternative embodiments, the data objects may provide links to some service or functionality (e.g., by providing access to an internal or external data network maintained by a subscriber).

Figure 5:
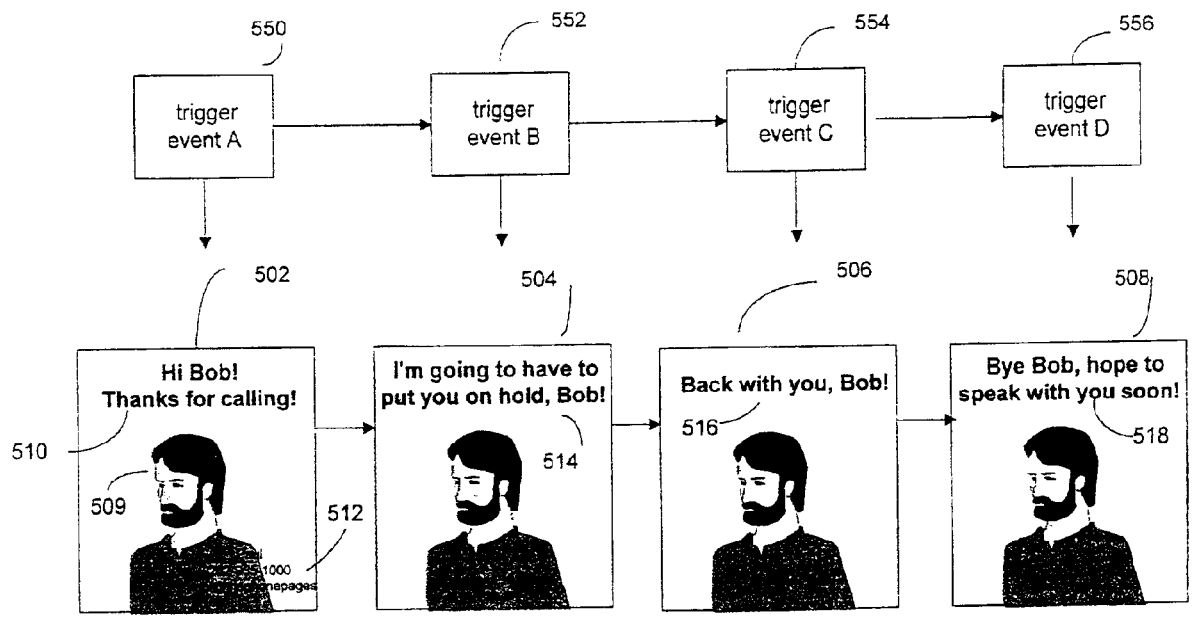
FIG. 5 shows an exemplary presentation of a series of data objects at a user device.

FIG. 5 provides an introduction which explains an exemplary use of the data objects (e.g., the phonepages) within the system 100. Presume that a first user, Bob, has placed a telephone call to a second user, Paul. Further presume, for instance, that Bob (the A-party) uses mobile user device 10 to place his call, and Paul (the B-party) uses mobile user device 138 to receive Bob's call. Further presume that Paul has defined a series of data objects (e.g., phonepages 502, 504, 506 and 508). In this case, Paul is the creator (also referred to as the "holder") of these data objects. Paul's data objects may be personalized to Bob (e.g., by making reference to Bob in the data objects). Alternatively, one or more of Paul's data objects may be generic (e.g., suitable for presentation to multiple different subscribers). Finally, presume that Bob has access to Paul's data objects (using one of the methods that will be described below).

A first trigger event 550 arises when Bob dials Paul's number. This prompts the user device 110 to display a data object 502. The data object 502 may include a personalized message 510, stating, e.g., "Hi Bob! Thanks for calling!" The data object may also include picture information, such as a picture 509 of Paul. The data object may also include textual information 512, such as the name, telephone number, and e-mail address of Paul. The data object may additionally include audio information, such as a brief introductory message spoken by Paul. This combination of data object components is entirely exemplary. Other data objects may provide a different combination of components, including additional types of information. Further, one or more of these data object components can be omitted to accommodate user devices that have reduced functionality, such as user devices that lack the capacity to display complex graphics.

After setting up the call, the user device 110 may then be configured to wait for another call event. In this exemplary case, the next call event occurs when Paul puts Bob on hold. This constitutes trigger event 552, which causes the user device to display a second data object 504. This data object 504 provides a message 514 that states, e.g., "I'm going to have to put you on hold, Bob!" The next event 554 occurs when Paul returns and takes Bob off hold, which prompts the user device to display a third data object 506. This data object 504 provides a message 516 which states, e.g., "Back with you, Bob!" In this exemplary demonstration, a final trigger event 556 may occur when either of the parties terminates the call, which prompts the user device to display a fourth data object 508. This data object 508 provides a message 518 which states, e.g., "Bye Bob, hope to speak with you soon!"

Another set of data objects may be rendered at the called party's user device. These data objects pertain to the calling party, and are generally created by the calling party (or on his behalf). Thus, in the above scenario, Paul may be able to view (and/or hear) a plurality of data objects in the course of his conversation with Bob.

Figure 6:
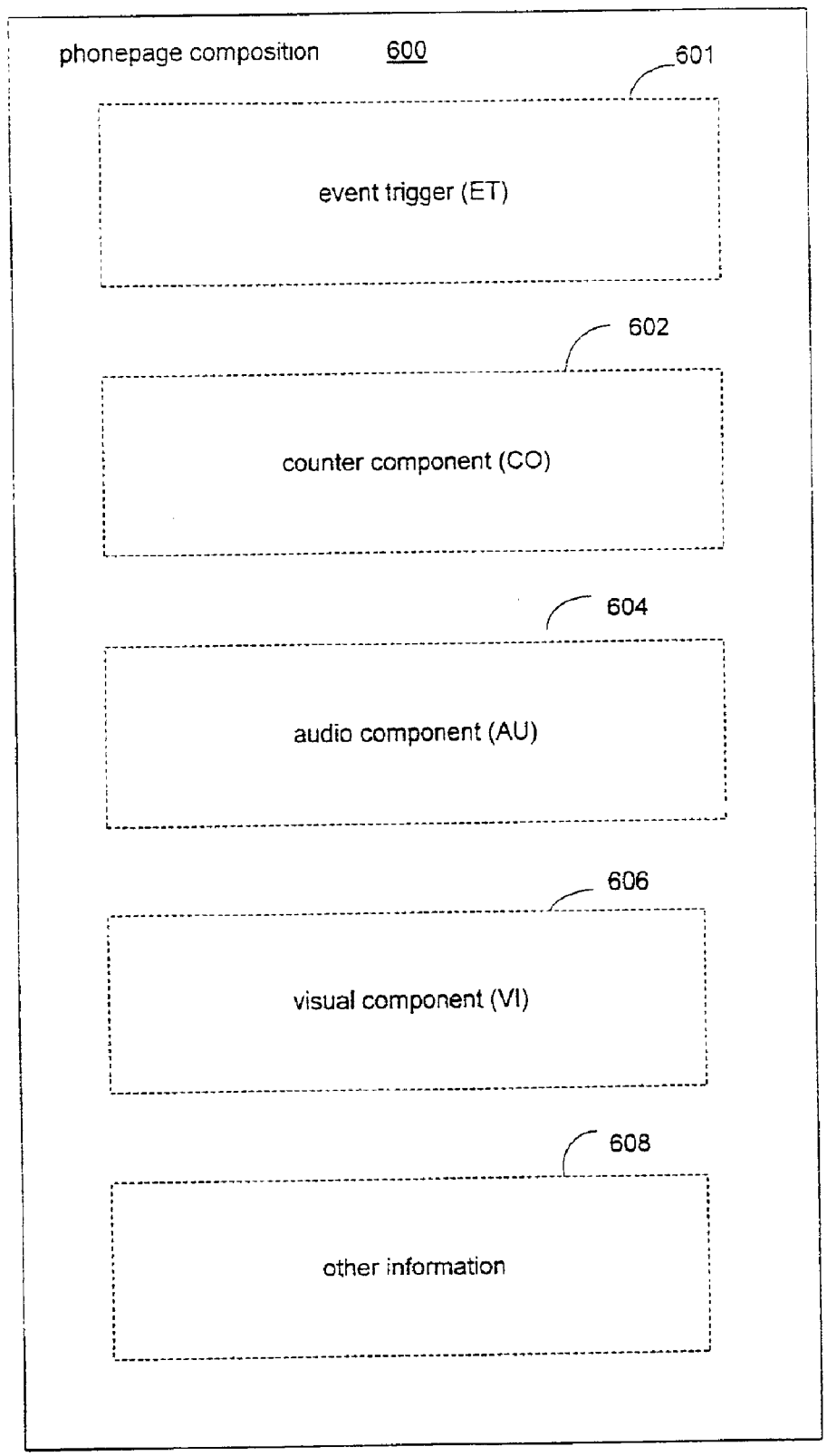
FIG. 6 shows an exemplary composition of a data object.

FIG. 6 illustrates the data components of an exemplary data object 600. The object 600 may include a first data field for storing an event trigger (ET) component 601. This component 601 indicates the nature of the event that will prompt the presentation of the data object. For instance, the ET component 601 may comprise a code that is associated with the event, and which serves as an index for use by a user device in retrieving the data object from memory upon the occurrence of the associated communication event.

Generally speaking, an event trigger may be attributed to one or more automatic events (e.g., when a call is terminated by the other party), or may be attributed to a manual event (e.g., when the A-party dials a number, such as the B-party's number). More specifically, triggering events may be associated with the following exemplary list of events: a) an outgoing call is (or is about to be) initiated; b) an addressed B-party answers a call; c) an addressed B-party is busy; d) an addressed B-party does not answer; e) an addressed B-party rejects a call; f) an addressed B-party is unavailable (e.g., an addressed mobile phone is out of coverage); g) an incoming call is imminent or has just started; h) a conference call is or is about to be initiated; i) a call is disconnected; j) a call is conducted (under which several triggering events can be generated); k) a subscriber is put on hold; l) a new cell in the new Public Land Mobile Network (PLMN) has been selected; m) the location of a subscriber has changed; n) a PLMN operator is selected; o) a new country of registration is made; p) a user device is about to be switched off; q) a user device has been switched on; r) a designated button on a user device is pressed; s) a talk spurt is received by a user device; t) a voice mail has been left to a subscriber; u) an SMS has been sent to a subscriber; and v) a user has commenced review of missed calls, received calls, and/or dialed numbers (or is in the course of review).

The second data field stores a counter component (CO) 602. The counter component may be used to indicate the number of times that a data object should be sent to a particular user. That is, a user device may lack the capacity to store a data object. In this case, the CO component may contain information which indicates that a data object should be sent to the user device each time a call event occurs. That is, in the above demonstration, presume that Bob's device lacked the capacity to store data objects. In this case, the CO component of the data objects would indicate that the transmitting source (e.g., either Paul's user device or the data server 150) should transmit the data objects upon every occurrence of the triggering events. In contrast, other user devices may have the capacity to store the data objects in their local memories (e.g., in the memories of their respective SIM cards). In this case, the CO component may contain information which indicates that the data objects should be sent to the users' devices only once.

A third data field may store an audio component (AU) 604. The audio component may contain a recording of the object's creator speaking various messages pertaining to the data object. For instance, in the case of FIG. 5, the first data object may include a voice message from Paul that states, "Hi Bob!," or any other type of greeting or instruction. The audio component may also specify the timing at which the audio information is to be rendered. For instance, the audio information may be played superimposed over the normal ring signal generated by the user device, before the ring signal, or after the ring signal. The audio component may alternatively indicate that the ring signal should be disabled. For instance, instead of a normal ring signal (such as the conventional ring or beep) being sounded at a called user device, the called user device may be configured to sound a voice message created by the calling party (such as, in the above scenario where Bob calls Paul, the message might announce, e.g., "Hello, its Bob!"). Further, the system may be configured to suppress the conventional ring signal normally heard by the calling party, and instead sound a voice message created by the called party (such as, in the above scenario, when Bob calls Paul, Bob may hear a message in which Paul announces, e.g., "Be patient, I'm coming," instead of a conventional ring signal.). Other audio messages may be sounded during the conversation upon the occurrence of one or more communication events. In still other embodiments, the audio component may provide a musical presentation. Still alternatively, the audio component may provide a variety of other sounds, such as various recorded or synthesized sounds (e.g., other than the recorded human voice).

A fourth data field may contain a visual component (VI) 606, generally encompassing any type of picture, video, graphic, and/or text element displayed at the user's device. For instance, in the case of FIG. 5, the data objects included a picture of the sender, Paul. The specific natures of these messages is entirely at the discretion of their creators, and may contain a variety of pictures or other fanciful figures. Generally, it is envisioned that a maker may want to create relatively formal data objects for formal acquaintances (e.g., business acquaintances), but may wish to create more personal data objects for friends and family, etc. The visual component may alternatively specify the display of only textual messages.

Finally, the fifth data field indicates that the data object may contain a variety of other information 608. Such information may include program code that modifies the functionality of the user's device upon the occurrence of an event, a link which provides access to remote resources (such as remote data server resources or networks), etc.

Figure 7:
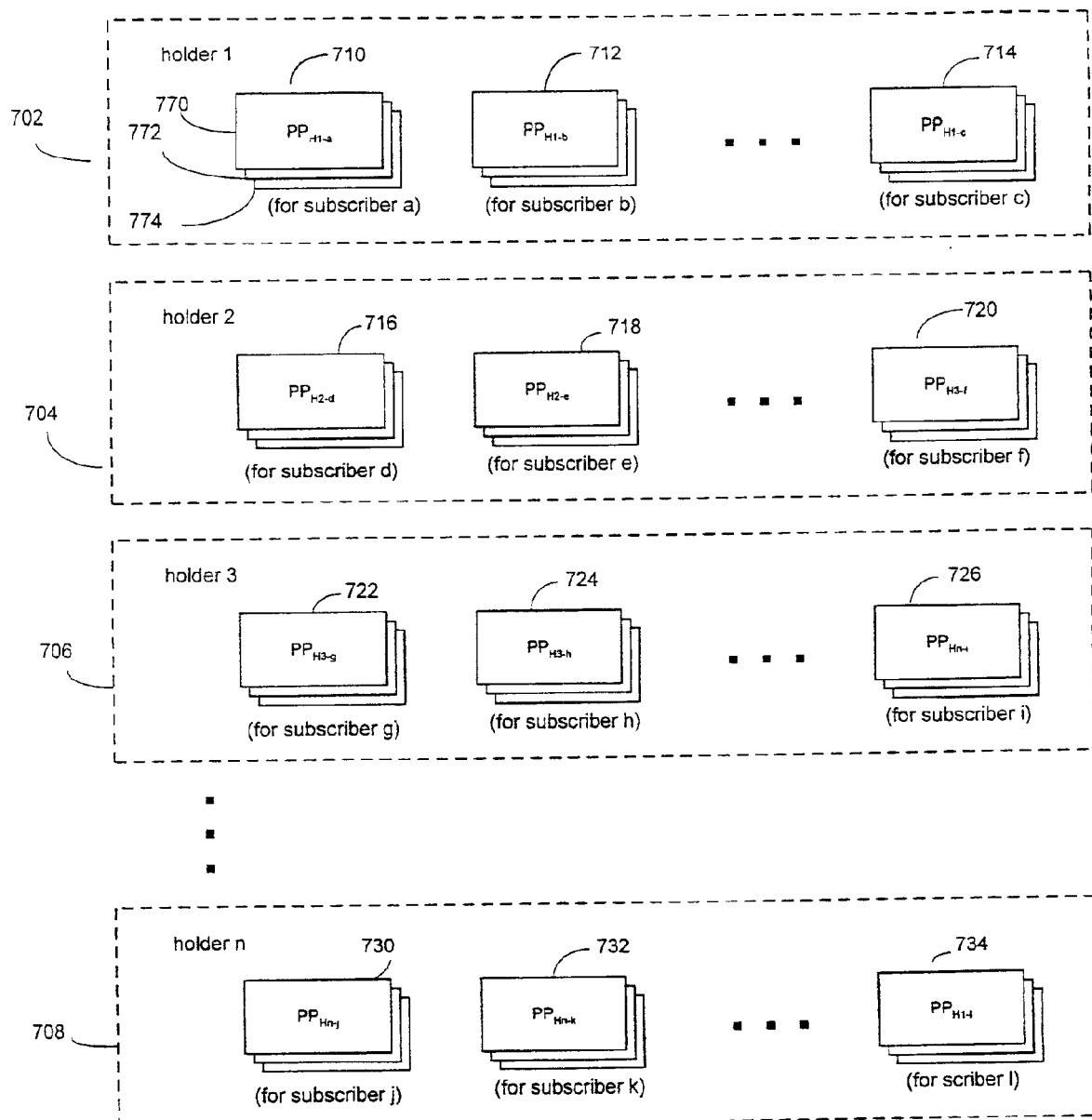
FIG. 7 shows an exemplary organization of data objects in the data server shown in FIG. 4.

FIG. 7 indicates the exemplary contents of the database 414 of data server 150 (with reference to FIG. 2). Each subscriber may create a plurality of sets of data objects for display at a respective plurality of user devices. In this figure, the creator of the data objects is referred to as a "holder," while the recipient is referred to as a subscriber. For example, a first holder, "holder 1," creates a set of data objects 710 for subscriber a. This set is alternatively denoted by $PP_{Hi-a}$ (indicating phonepages, PP, created by holder $H_i$ for subscriber "a"). Each of the data objects in this set pertains to a different call event (an exemplary list of which was presented above). That is, data object 770 may be triggered by a first event (e.g., by the initiation of a call), data object 772 may be triggered by a second event (e.g., the establishment of a conference call), and data object 774 may be triggered by a third event (e.g., by the termination of a call). Holder 1 also creates a second set of data objects 712 for subscriber "b." Holder 1 also creates a third set of data objects 714 for subscriber "c." These plural sets of data objects for holder 1 constitute its master set of data objects 702. (To the extent that there may be common data objects used by different subscribers, the data server 150 can be configured to store only one copy of these common data objects, and to provide suitable indexing to indicate the sets to which these common data objects belong.)

Similarly, holder 2 may store plural sets (716, 718, 720) of data objects for respective subscribers (d, e, f) to create a master set of data objects 704. Similarly, holder 3 may store plural sets (722, 724, 726) of data objects for respective subscribers (g, h, i) to create a master set of data objects 706. Similarly, holder n may store plural sets (730, 732, 734) of data objects for respective subscribers (j, k, l) to create a master set of data objects 708.

It should be noted that the holder need not define unique sets of data objects for each subscriber. In one case, for instance, a holder may define a single set (e.g., series) of data objects for a class of subscribers. Further, there may be administrative advantages to encouraging the holders to design data objects from a common base template (or series of templates). Additional details regarding the use of base templates is provided in section No. 3 of this disclosure.

2. System Operation

Having described the exemplary architecture and functional features of the system 100, its operation will now be discussed.

A primary objective of the system is to supply data objects to the user devices for rendering thereat. Several techniques are envisioned for performing this task. By way of overview, in a first technique, a master set of data objects is created on the data server 150. The master set is then transferred to the holder's user device. Upon the occurrence of a call event pertaining to one of the subscribers identified in the master set, the appropriate set of data objects is transferred from the holder's user device to the subscriber's user device. The set of data objects is then rendered by that subscriber in the course of the call (or other event). In a second technique, a master set of data objects is created on the data server 150. The master set is then directly disseminated to appropriate user devices identified in the master set. Each user device then renders its set of data objects upon the occurrence of communication events. In a third technique, the user device may request that the data server download one or more data objects at any time, e.g., when an event arises for which the holder has created one or more data objects.

Figure 8:
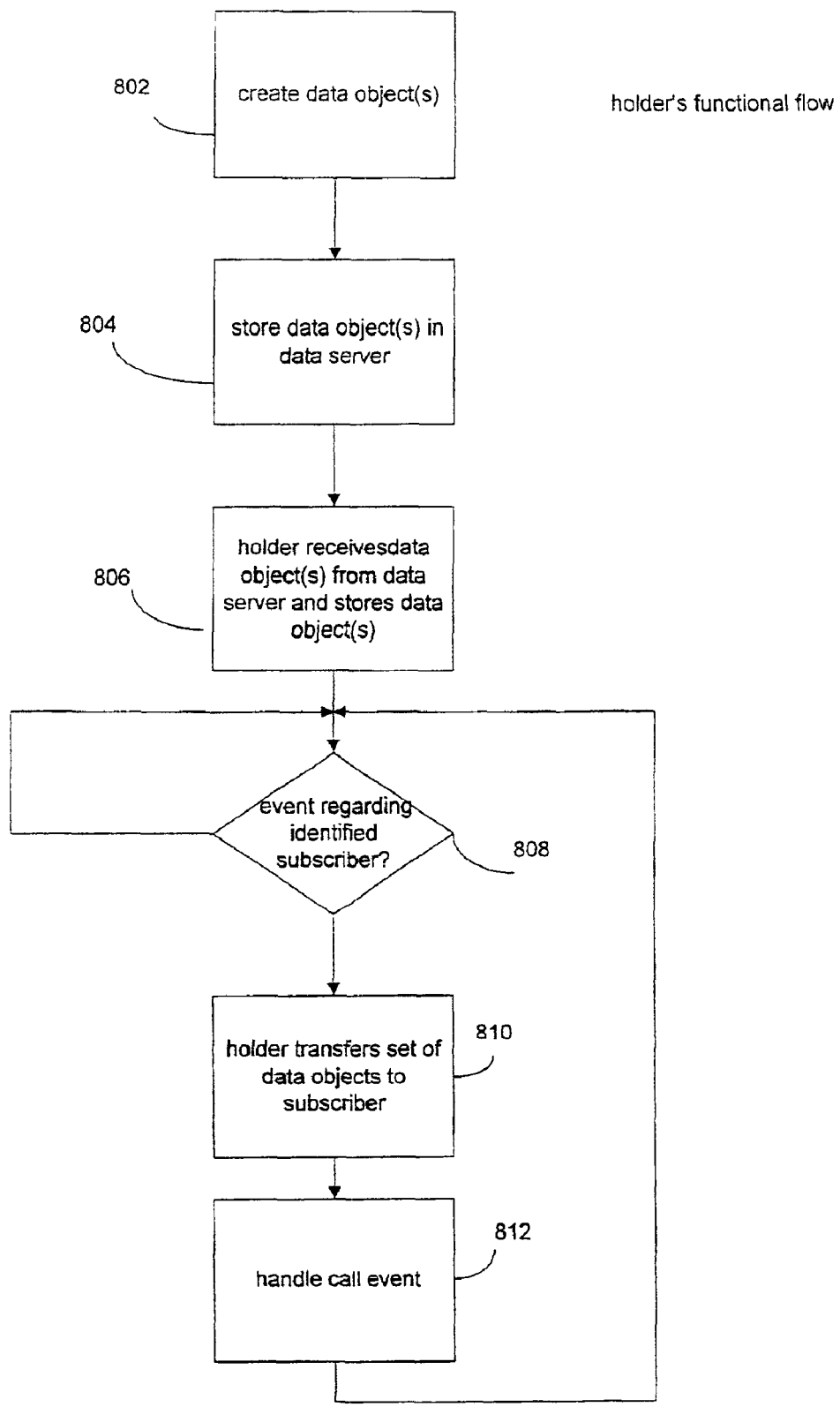
FIG. 8 shows an exemplary procedure for forwarding data objects to subscribers, according to one embodiment.

FIG. 8 shows a sequence of steps appropriate for the first identified technique. In step 802, data objects are created. The holder (or other entity) may perform this function by accessing the data server 150 via a computer devices (e.g., computer device 146 or device 148) and then designing the data objects. For instance, the user may design one or more data objects via a "web" interface. This data path is denoted as path 152 in FIG. 1. Alternatively the holder (or other entity) may direct the creation of the data objects via a mobile station device (e.g., such as mobile telephone 110).

In an alternative embodiment, an operator of the data server 150 (or some other entity) may create or assign one or more default data objects on behalf of a user. The creation or assignment of data objects may be triggered by the user subscribing to a data object-related service (or some other service), or by some other manual or automatic event. This feature potentially generates a great number of data objects in a short period of time without burdening individual users to create their own data objects. At the same time, the system may be configured to allow any user to modify the default data objects created or assigned for them to create unique data objects.

In step 804, the data server 150 downloads a master set of data objects to the holder's user device (e.g., user device 110). This data path is denoted as path 154 in FIG. 1. The system 100 may perform this transfer using any one of a variety of different types of messaging platforms and protocols. For instance, the data objects can be transmitted using the Short Message Service (SMS) protocol (commonly used in GSM systems, for instance). In this protocol, the information is transmitted through the data network 142 and gateway 140 to message center 126, and is thereafter transferred to the holder's user device (e.g., user device 110). The information may also pass through the PSTN network 128 depending on the location of the addressed holder's user device and/or the architecture of the system (e.g., generally the SMS information may be transported from one PLMN to another using an SS7 signaling network, that may or may not form part of the PSTN). In step 806, the holder receives the data objects from the data server 150 and stores the data objects.

In step 808, the holder's user device awaits for the occurrence of an event which pertains to one of the subscribers represented in the master set of data objects (i.e., referred to here as an "identified subscriber"). This may comprise, for example, a telephone call placed to the holder by an identified subscriber. In response thereto, the holder's user device transfers the appropriate set of data objects to the identified subscriber (in step 810). This transfer may be implemented using any one of a variety of message protocols. For instance, the data objects can be transmitted using the Short Message System (SMS) protocol. In step 812, the holder's user device then handles the call event, e.g., by conducting a voice communication session with the identified subscriber. In alternate embodiments, the holder may manually initiate the transfer of the data objects (e.g., by making an appropriate selection on the keyboard of the holder's user device). In alternative embodiments, the holder's user device may automatically transfer the data objects (e.g., immediately upon receipt from the data server 150, or at another time).

Figure 9:
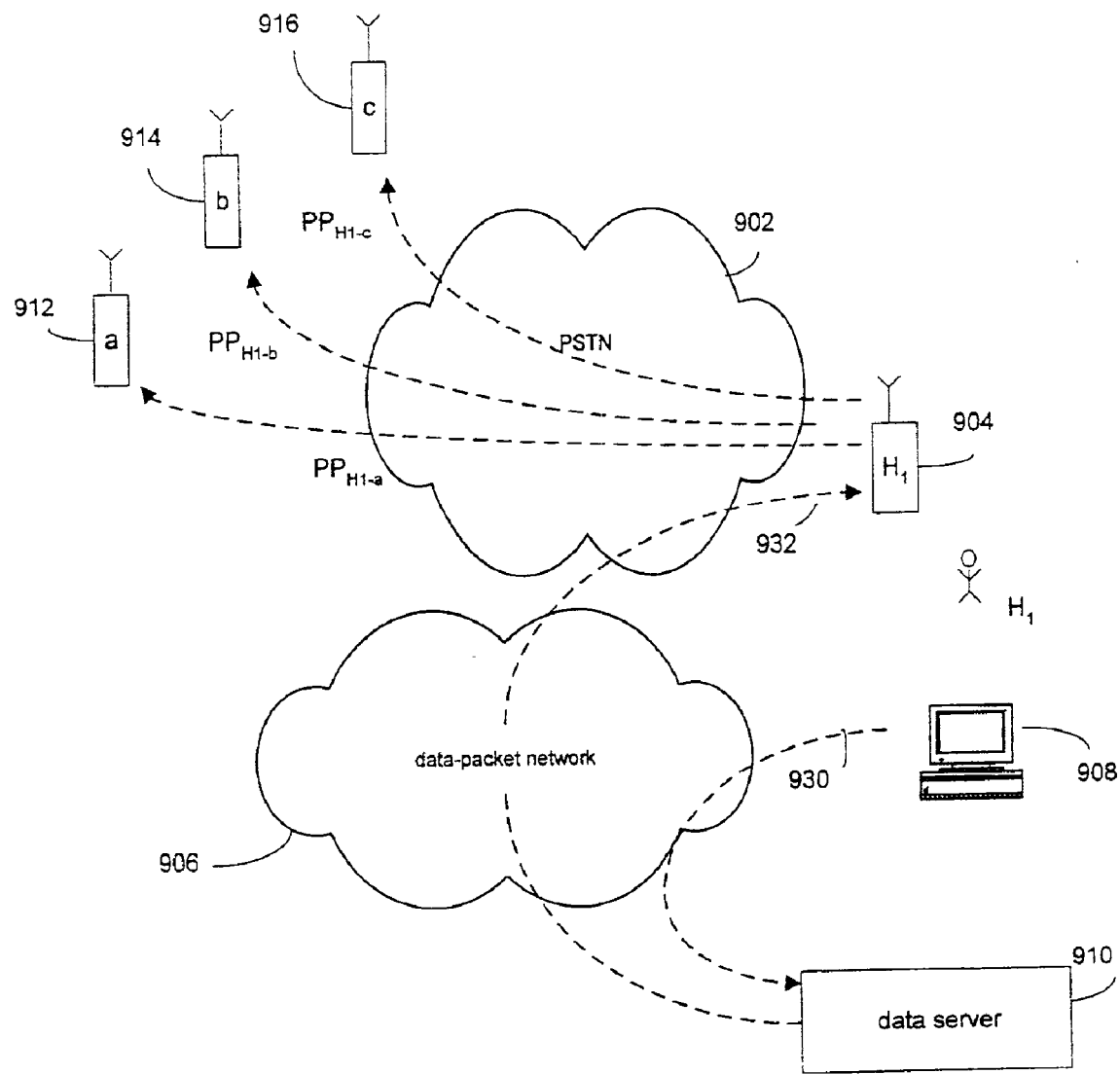
FIG. 9 shows an exemplary transfer path of data objects pursuant to the procedure of FIG. 8.

FIG. 9 shows the flow of data objects through the system pursuant to the procedure of FIG. 8. As indicated there, the data objects are created at the data server 910 using computer device 908 (or other type of interfacing device). This data path is labeled as path 930. The data objects are thereafter transferred through the data network 906 to the holder's user device 904 via path 932. This path is shown to involve a transfer over the PSTN 902 (but this need not be so, e.g., depending on where the data network feeds into the MSC and other factors). Thereafter, the data objects are distributed over the PSTN 902 to identified subscribers. Name, for master set 702 shown in FIG. 7, data object set $PP_{HI-a}$ is transferred to subscriber "a" 912, data object set $PP_{HI-b}$ is transferred to subscriber "b" 914, and data object set $PP_{HI-c}$ is transferred to subscriber "c" 916.

Figure 10:
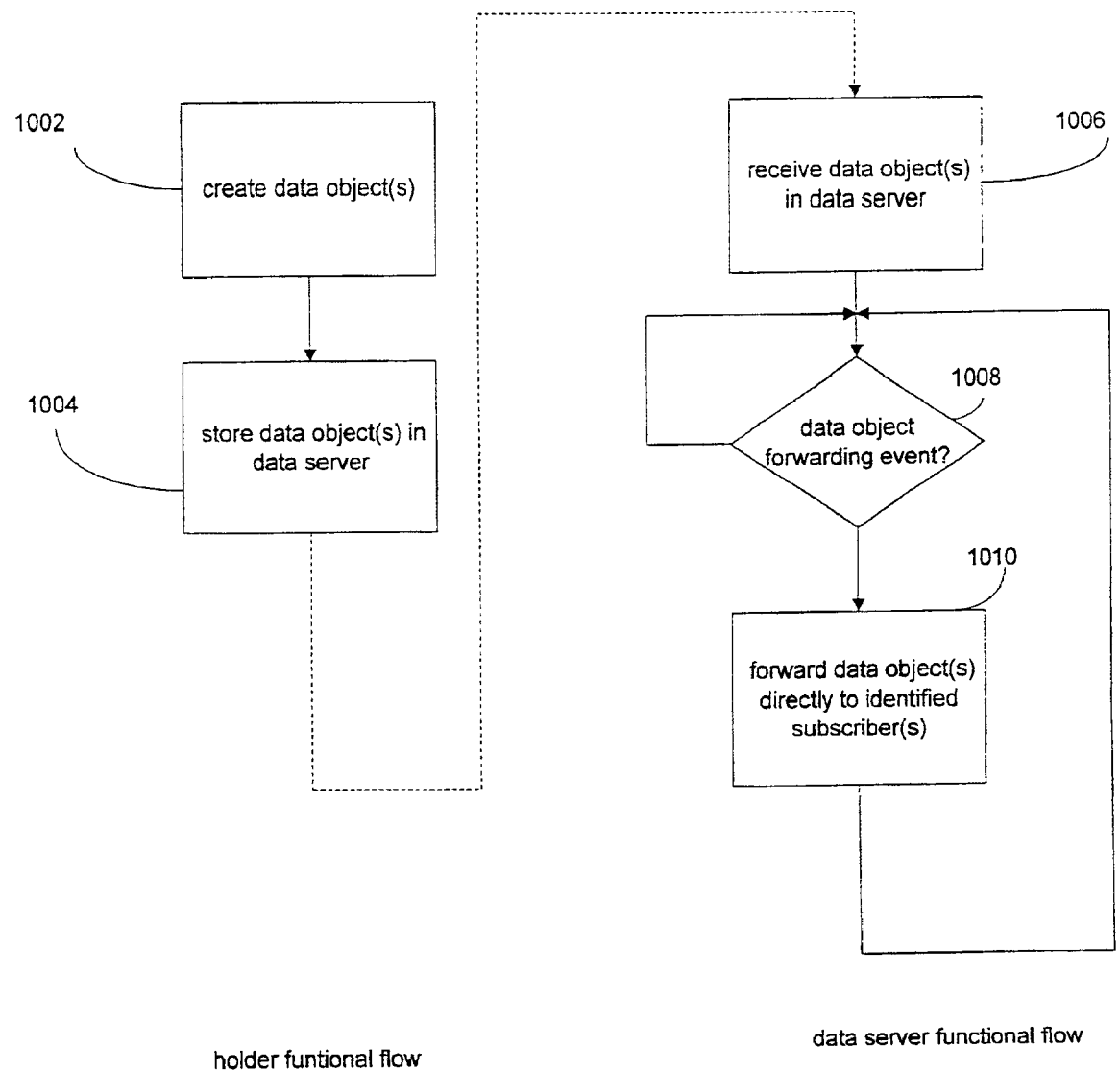
FIG. 10 shows an exemplary procedure for forwarding data objects to subscribers, according to another embodiment.

FIG. 10 illustrates the second technique for supplying data objects to a user device. In step 1002, the holder (or other entity) creates a master set of data objects at the data sever 150, e.g., using a computer device 146 or other type of interfacing device. In step 1004, the holder stores the master set of data objects at the data server 150.

In step 1006, the data server receives the master set of data objects. In step 1008 the data server then determines whether it should transfer the data object sets in the master set of data objects to the appropriate recipients. Different systems may be configured to use different factors to determine when to download data object sets. In one embodiment, the data objects are transferred immediately after creation by the holder (or other entity). In another embodiment, the data objects are transferred upon the request of the holder (or other entity). In a third embodiment, the data object sets are transferred to appropriate user devices during times when the system is not heavily burdened with a large communication load (e.g., during early morning hours). In step is 1010, the data server 1010 forwards the data objects directly to the identified subscribers. A variety of message formats can be used to perform the transfer, such as the Short Message Service (SMS) protocol.

Figure 11:
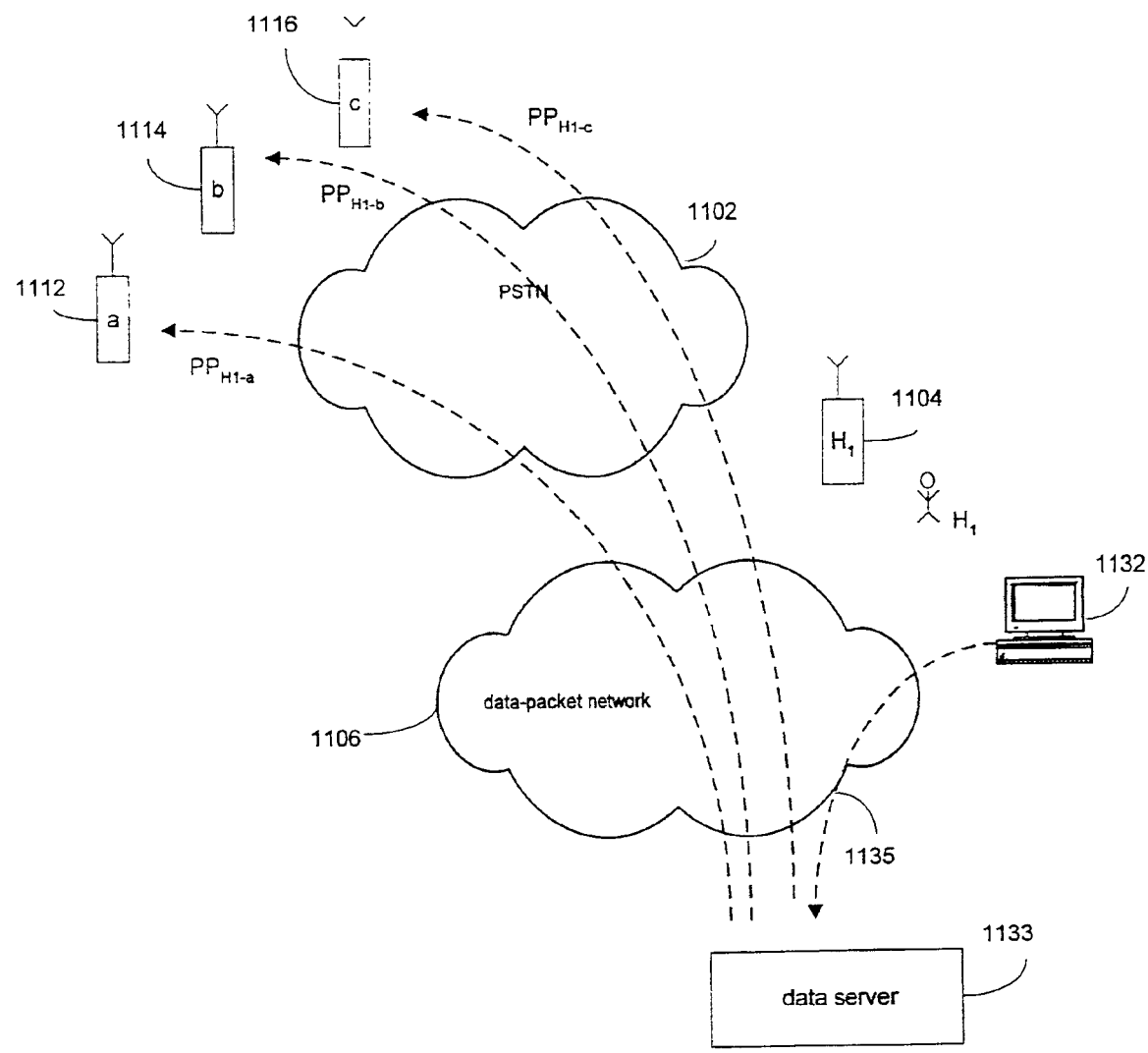
FIG. 11 shows an exemplary transfer path of data objects pursuant to the procedure of FIG. 10.

FIG. 11 shows the flow of data objects through the system pursuant to the procedure of FIG. 10. As indicated there, the data objects are created at the data server 1133 using computer device 1132 (or other type of interfacing device). This data path is illustrated as path 1135. The data objects are thereafter directly transferred through the data network 1106 to identified subscribers. The data objects are also potentially transferred through PSTN 1102 depending on the location of the addressed subscribers and/or the architecture of the system (e.g., generally the SMS information may be transported from one PLMN to another using an SS7 signaling network, that may or may not form part of the PSTN). As a result, for the master set 702 shown in FIG. 7, data object set $PP_{HI-a}$ is transferred to subscriber "a" 1112, data object set $PP_{HI-b}$ is transferred to subscriber "b" 1114, and data object set $PP_{HI-C}$ is transferred to subscriber "c" 1116.

One possible complication of the above-described technique pertains to the charging arrangement employed by the SMS messaging service. Some SMS charging arrangements specify that the sender of the message pays for the message transfer. This would imply that the data server operator would be saddled with the cost of the transfer. However, this cost may be circumvented in various ways. For instance, the message center 126 of the mobile communication system 125 may be configured to require that the holder transmit an SMS message to the message center 126 to trigger its delivery of data objects to the designated subscribers. This trigger signal can designate the billing event. Alternatively, the data server may simply pass down the costs of message transfer to the holders. The holder can also send an SMS message to the data server 150 to trigger its transfer of the data objects to the designated subscribers.

Figure 12:
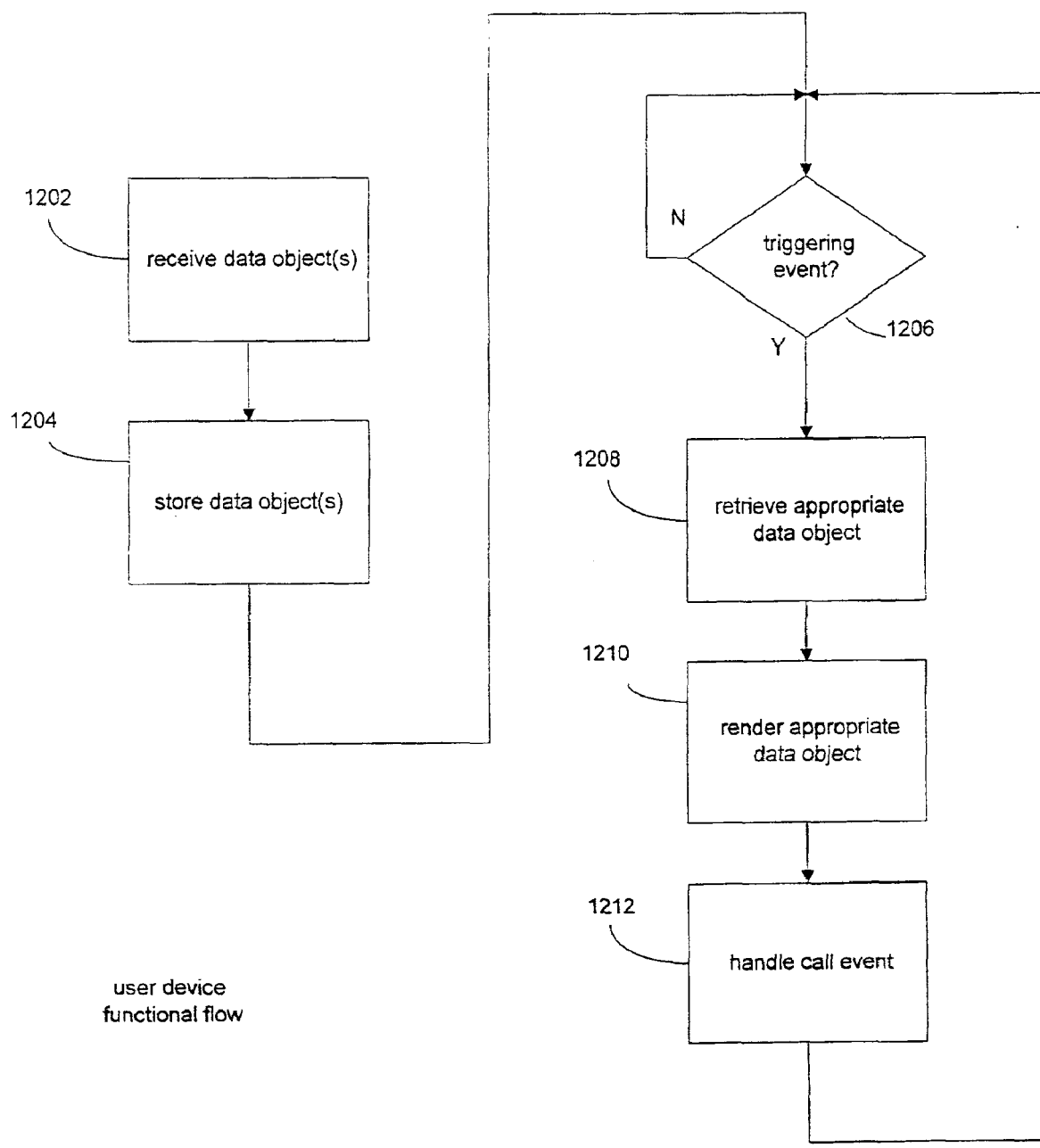
FIG. 12 shows an exemplary procedure for obtaining and rendering data objects at a user device, according to one embodiment.

FIG. 12 shows a sequence of steps used by a user device to render (e.g., display) the data objects stored in its local memory. In step 1202, the user device receives the data objects (which have been transferred by the method of FIG. 8 or FIG. 10, or by some other method). In step 1204, the user device stores the data objects. In step 1206, the user device determines whether a triggering event has occurred. Exemplary triggering events were discussed above. If a triggering event has occurred, the user device retrieves the appropriate data object (in step 1208). More specifically, in one exemplary embodiment, an appropriate set of data objects (e.g., pertaining to a holder) may be identified by identifying the party with whom the user is communicating (e.g., by noting the telephone number of that party which is transmitted to the user device in the course of setting up a call). A particular data object within that set may be accessed by matching a code associated with the event that has occurred with a corresponding code associated with the data object. In step 1210, the user device renders the data object. In step 1212, the user device handles the call event (e.g., by placing or receiving a call, etc.).

FIG. 13 provides another technique that the user device can use to obtain one or more data objects from the data server. The technique begins in step 1302, in which the user device determines whether a triggering event has occurred (which may include any one of the above-identified user events). In step 1304, the user device sends a data object request to the data server. In step 1306, the user device receives the requested data object from the data server. In step 1308, the user device renders the received data objects.

The data object request in step 1304 may specifically include at least one of the following parameters: a) a requested protocol to be used for transmission (e.g., WAP, WML, HDML, HTML, XML, etc.); b) an identification of a data object server (e.g., a server name or a plain IP address); c) a code denoting what kind of event triggered the data object request (e.g., outgoing call setup); d) the indicated B-number associated with at least one B-party equipment; e) an A-party identity and/or a secret A-party identity (e.g., an A-number of a mobile station); f) a network address of the A-party (e.g., IP address) used by the data object server when returning a requested data object; g) a capability code indicating the displaying capabilities of the A-party (e.g., screen resolution, audio, etc.); h) a code indicating an encryption scheme or encryption key used; i) a code indicating the country that the mobile station is registered in (i.e., country code); j) a code identifying the current PLMN (V-PLMN) operator or the PLMN where the A-party has a subscription (H-PLMN) or both; k) a code indicating the vendor of the mobile station and the type of the mobile station; l) a code indicating a unique equipment identity; and m) a validation code (e.g., a checksum) of the parameters.

In an alternative embodiment, a subscriber may "manually" retrieve one or more data objects from the data server (e.g., by making appropriate selections on the keyboard of the user device). This selection constitutes the triggering communication event.

FIG. 14 shows corresponding procedures performed in a data object server (such as data object server 150) in response to the procedures shown in FIG. 13. Namely, in step 1402, the data server receives a request for a data object (or objects). The request typically includes (in exemplary embodiments) at least an indication specifying an A- or B-number and a specification of what kind of action triggered the request. The address indication (e.g., A- or B-number) is mapped to a memory address in the data object server, or to an address provided in another database maintained at some other site. The address may specify a data object, such as a phonepage. The data server retrieves the data object in step 1404. The request received in step 1402 may also include an indication of a user device display capability. In this case, the data server may adapt the retrieved data object to the requested format in step 1406. Alternatively, the database may store the data objects in different formats. In this case, the data server complies with the request by retrieving the data object having the correct format. The data server sends the data object in step 1408.

Various data transfer mechanisms can be used to transfer the data (e.g., requests and data objects) discussed in FIGS. 13 and 14. For instance, SMS messaging can be used. Alternatively, a GPRS data path can be used. Further details regarding the transfer of information using a GPRS channel may be found in the applications identified in the CROSS REFERENCE TO RELATED APPLICATIONS section of this disclosure.

3. Variations

The above-discussed system and method can be modified in various ways. For instance, all information transmitted over the data network 142 and/or PSTN 128 (or some other network) may be encrypted prior to transfer to ensure message privacy. The receiving site could then decrypt the transmitted information prior to display or processing. For instance, the data server may encrypt data objects prior to transfer to the holder's or subscribers' user devices. The user devices can then decrypt the data objects prior to rendering them. The user devices may also encrypt any requests, messages, data objects, etc. that the devices send to other entities, such other user devices or the data server.

Figure 15:
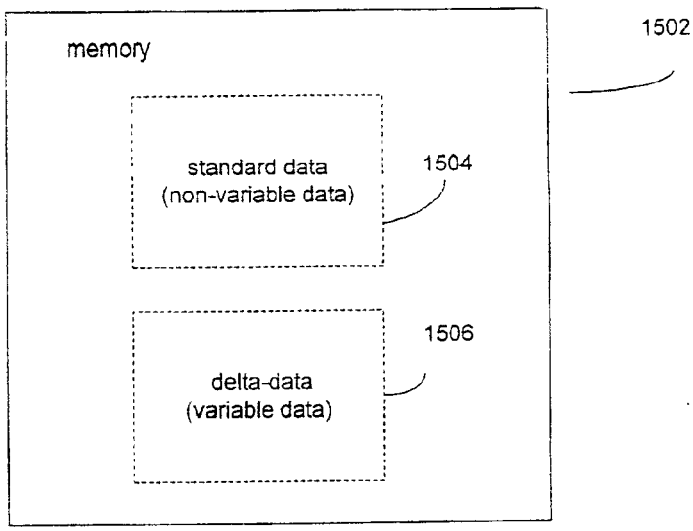
FIG. 15 shows an alternative way of storing data objects in a memory of a user device.

In another variation, the memories of the user devices may be configured in the manner shown in FIG. 15. In that figure, an exemplary memory 1502 includes standard (i.e., non-variable) data 1504. The standard data 1504 may specify one or more base templates. The base templates may pertain to common elements in the data objects designed by plural holders (e.g., where multiple holders are using the same basic phonepage layout to design their pages). In addition, or alternatively, the base templates may pertain to common features within a particular holder's set of data objects (e.g., where the holder has several phonepages that share the same background scene). On the other hand, the memory 1502 also includes delta (i.e., variable) data 1506. The delta-data pertains to the unique features of the rendered data objects. The unique features refer to the features of the rendered data objects which distinguish them from the base templates stored in the standard data 1504.

Figure 16:
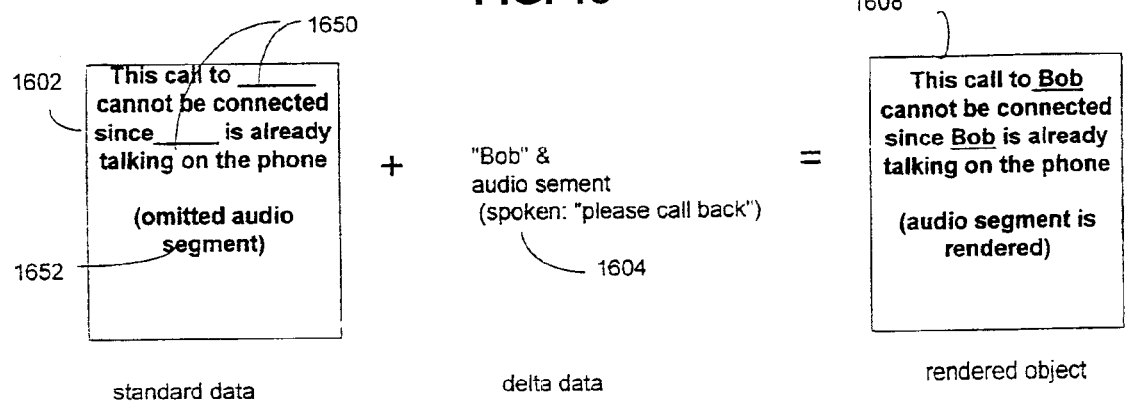
FIG. 16 shows partition of a data object corresponding to the alternate storage technique shown in FIG. 15.

FIG. 16 shows one example of a standard data portion 1602 and delta-data portion 1604 for an exemplary data object. This figure also shows how these two portions are combined to produced the rendered object 1608. More specifically, for this data object, the standard data portion 1602 may provide a base template with a generic message. The message has fields 1650 that can be filled in with text to personalize the message. Further, the standard data portion 1602 includes a field 1652 that can be filled in with an audio message to further personalize the data object. The delta-data portion 1604, on the other hand, comprises the personalized text "Bob" coupled with the personalized audio greeting, such as "please call back." The delta-data is "added" to the standard data portion to produce the rendered data object 1608.

Figure 17:
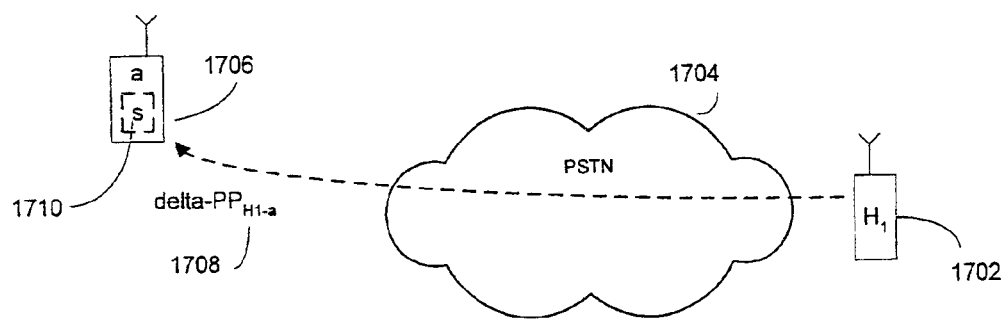
FIG. 17 shows an exemplary transfer path of data objects associated with the alternative storage technique shown in FIG. 15.

The storage format shown in FIG. 15 provides for more efficient storage and transfer of data objects. With reference to FIG. 17, for instance, a user device 1706 (operated by subscriber "a") may store standard data "s" in its memory. This standard data may be used to render a plurality of data objects. Storage of a single copy of such redundant data reduces the storage requirements of the user device. Further, when the user device 1706 receives additional data objects which use the standard data in their design, it is only necessary to transfer the delta-data to the user device 1706 (such as delta-data 1708 for data object $PP_{HI-a}$).

In one embodiment, the standard data can be transferred to the user devices at any time (e.g., not necessarily when a communication event occurs). In one embodiment, the SIM card provided to the user may already contain standard data containing one or more common data object templates.

According to another variation, the Unstructured Supplementary Services Data (USSD) protocol may be used to transmit data objects to the user devices, instead of, or as a supplement to, the use of the SMS protocol. USSD and SMS are alike in that they both may use the GSM system's signaling path to transmit data messages. But the USSD protocol does not define a store-and-forward type of service, unlike the SMS protocol. Still other protocols can be used to transfer data objects.

Figure 18:
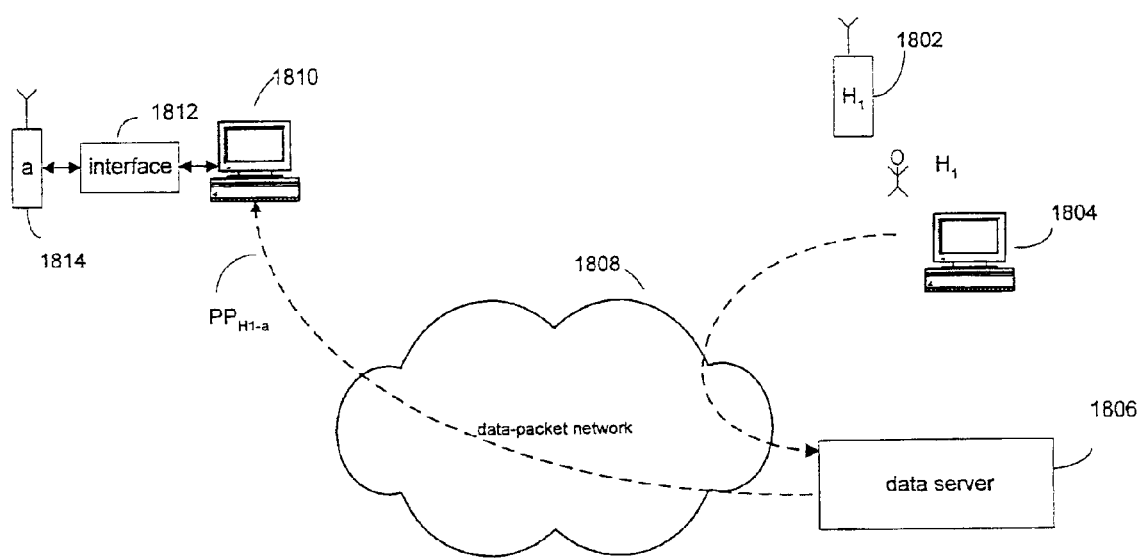
FIG. 18 shows an alternative way of transferring data objects from a data server to a subscriber's user device.

FIG. 18 shows another variation. More specifically, this figure shows structure which varies from previous figures by including a computer device 1810 coupled to an interface unit 1812, which, in turn, is coupled to user device 814 In one embodiment, the computer device 1810 may comprise a personal computer device. The interface unit 1812 may comprise any coupling mechanism for transferring information between the computer device 1810 and the user device 1814. The link between the computer device 1810 and the user device 1814 may comprise a hardwired link, a wireless link (e.g., radio or infrared), or some other type of link. In one embodiment, the interface unit 1812 may further comprise a socket-type of coupling mechanism (not shown) which receives the user device 1814 and which includes appropriate terminals (not shown) for mating with input/output terminals (not shown) provided on the user device 1814.

The operation of the system shown in FIG. 18 has similarities to the procedure shown in FIG. 10. Namely, the holder (or other entity) creates a master set of data objects at the data sever 1806, e.g., using a computer device 1804 or other type of interfacing device. The data server 1806 then receives and stores this master set of data objects.

The data server 1806 then determines whether it should transfer the data object sets in the master set of data objects to the appropriate recipients. Different systems may be configured to use different factors to determine when to download data object sets. In one embodiment, the data objects are transferred immediately after creation by the holder (or other entity).

In another embodiment, the user device 1814 sends a request to data server 1806 via the computer device 1810. The request may instruct the data server 1806 to download one or more data objects to computer device 1810. More specifically, the user device 1814 may instruct the data server 1806 to send updated data objects pertaining to the data objects that are stored in the user device's local memory (e.g., in the user device's phonebook stored in the SIM card, or in another memory of the user device). Alternatively, the user device 1814 may simply instruct the data server 1806 to send whatever data objects the data server 1806 independently determines should be downloaded to the user device 1814. Still alternatively, the user device 1814 may instruct the data server 1806 to send updated data objects pertaining to the data objects stored in the user device's local memory, but the data server 1806 still exercises independent judgment whether it complies with this request in whole or in part.

In another embodiment, the computer device 1810 independently sends a request to the data server 1806. That is, the computer device 1810 may send a request to the data server 1806 even when the user device 1814 is not coupled to the computer device 1810 via the interface unit 1812. The request may instruct the data server 1806 to download one or more data objects to the computer device 1810. More specifically, the computer device 1810 may instruct the data server 1806 to send updated data objects pertaining to the data objects that are stored in the user device's local memory (e.g., in its user device's phonebook stored in the SIM card, or in another memory of the user device). In an alternative embodiment, the computer device 1810 may be configured to send a request to the data server 1806 on a periodic basis.

In another embodiment, the data server 1806 initiates transfer of data objects to the computer 1810 without being specifically requested to do so by the computer 1810 or the user device 1814. That is, the data server 1806 may use its own "time table" to determine when to download data objects. In an alternative embodiment, the computer device 1810, user device 1814, or some other entity (e.g., the holder) may send an instruction to the data server 1806 which specifies the frequency at which the data server 1806 should download data objects to the computer 1810. For instance, the subscriber operating user device 1814 may instruct the data server 1806 to download data objects for a particular holder on a relatively frequent basis if that particular holder is known to change his data objects frequently.

Those skilled in the art will recognize that still further variations can be used to determine the timing at which data objects are transferred to subscriber "a", as well as to determine the identity of those data objects that are transferred.

If it is time to transfer the data objects, the data server 1806 transfers the objects directly to the recipients' computer devices. In the FIG. 18 scenario, the data server 1806 transfers a set of data objects $PP_{HI-a}$ to subscriber a's computer device 1810. Transfer may be via conventional protocol over the data-packet network 1808. Upon receiving the data objects, the computer device 1810 then transfers the data objects via the interface 1812 to the subscriber's user device 1814.

Other modifications to the embodiments described above can be made without departing from the spirit and scope of the invention, as is intended to be encompassed by the following claims and their legal equivalents.

What is claimed is:

1. A method for supplying a data object to a user of a communication system, comprising the steps of:

creating a data object intended for rendering at a first communication device, the rendering to take place upon the occurrence of a triggering communication event, the triggering communication event comprising a call trigger event associated with a telephone connection between the first communication device and a second communication devices, the data object providing information pertaining to a user of the second communication device, the data object providing at least visual content upon being rendered, storing the data object in a data server;

transferring, in a first transferring step, the data object from the data server to the second communication device;

transferring, in a second transferring step, the data object from the second communication device to the first communication device; and wherein the data object is adapted such that upon a determination that the triggering communication event has occurred, the data object is rendered at the first communication device.

2. The method of claim 1, wherein the data object includes a trigger component which indicates the nature of the triggering communication event.

3. The method of claim 1, wherein the user of the second communication device comprises a holder of multiple data objects and the user of the first communication device comprises a data object recipient, and further wherein at least one of the holder's data objects are call trigger event-specific such that a particular call trigger event results in the rendering of the data object to the recipient that is specific to that call trigger event.

4. The method of claim 1, wherein the user of the second communication device comprises a holder of multiple data objects and the user of the first communication device comprises a data object recipient, and further wherein at least one of the holder's data objects are holder-specific such that a particular call trigger event results in the rendering of a data object to the recipient that presents information that is specific to the holder.

5. The method of claim 1, wherein the user of the second communication device comprises a holder of multiple data objects and the user of the first communication device comprises a data object recipient, and further wherein at least one of the holder's data objects are recipient-specific such that a particular call trigger event results in the rendering of a data object to the recipient that presents information that is specific to the recipient.

6. The method of claim 1, wherein the first and/or second communication devices comprise mobile station devices.

7. The method of claim 1, wherein the triggering communication event comprises an event pertaining to a call initiated by a user of the first communication device or a call initiated by a user of the second communication device.

8. The method of claim 1, wherein the data object comprises a variable portion and a non-variable portion, and wherein the first and/or second transferring step transfer only the variable portion.

9. A method for supplying a data object to a user of a communication system, comprising the steps of:

creating a data object intended for rendering at a first communication device, the rendering to take place upon the occurrence of a triggering communication event, the triggering communication event comprising a call trigger event associated with a telephone connection between the first communication device and a second communication devices, the data object providing information pertaining to a user of a second communication device, the data object providing at least visual content upon being rendered;

storing the data object in a data server;

transferring the data object from the data server to the first communication device; and wherein the data object is adapted such that upon the first communication device determining that the triggering communication event has occurred, the data object is rendered at the first communication device.

10. The method of claim 9, wherein the data object includes a trigger component which indicates the nature of the triggering communication event.

11. The method of claim 9, wherein the user of the second communication device comprises a holder of multiple data objects and the user of the first communication device comprises a data object recipient, and further wherein at least one of the holder's data objects are call trigger event-specific such that a particular call trigger event results in the rendering of the data object to the recipient that is specific to that call trigger event.

12. The method of claim 9, wherein the user of the second communication device comprises a holder of multiple data objects and the user of the first communication device comprises a data object recipient, and further wherein at least one of the holder's data objects are holder-specific such that a particular call trigger event results in the rendering of a data object to the recipient that presents information that is specific to the holder.

13. The method of claim 9, wherein the user of the second communication device comprises a holder of multiple data objects and the user of the first communication device comprises a data object recipient, and further wherein at least one of the holder's data objects are recipient-specific such that a particular call trigger event results in the rendering of a data object to the recipient that presents information that is specific to the recipient.

14. The method of claim 9, wherein the first and/or second communication devices comprise mobile station devices.

15. The method of claim 9, wherein the triggering communication event comprises an event pertaining to a call initiated by a user of the first communication device or a call initiated by a user of the second communication device.

16. The method of claim 9, wherein the data object comprises a variable portion and a non-variable portion, and wherein the transferring step transfers only the variable portion to the first communication device.

17. The method of claim 9, wherein the transferring step comprises:

transferring the data object over a data network to a computer device; and transferring the data object from the computer device to the first communication device, via an interface unit.

18. A system for supplying a data object to a user of a communication system, comprising:

a first communication device;

a second communication device;

wherein the first communication device and the second communication device are adapted to communicate via a communication system for conducting voice communication;

a data server;

wherein the data server is coupled to a data network;

wherein the data server includes:

(i) logic for creating a data object intended for rendering at the first communication device, the rendering to take place upon the occurrence of a triggering communication event, the triggering communication event comprising a call trigger event associated with a telephone connection between the first and second communication devices, the data object providing information pertaining to a user of the second communication device, the data object providing at least visual content upon being rendered;

(ii) a database;

(iii) logic for storing the data object in the database;

(iv) logic for transferring the data object from the data server to the second communication device;

wherein the second communication device includes:

(i) logic for transferring the data object to the first communication device;
wherein the first communication device includes:
(i) logic for determining whether the triggering communication event has occurred;
(ii) a rendering device; and
(iii) logic for rendering the data object on the rendering device upon the occurrence of the triggering communication event.

19. The system of claim 18, wherein the data object includes a trigger component which indicates the nature of the triggering communication event.

20. The system of claim 18, wherein the user of the second communication device comprises a holder of multiple data objects and the user of the first communication device comprises a data object recipient, and further wherein at least one of the holder's data objects are call trigger event-specific such that a particular call trigger event results in the rendering of the data object to the recipient that is specific to that call trigger event.

21. The system of claim 18, wherein the user of the second communication device comprises a holder of multiple data objects and the user of the first communication device comprises a data object recipient, and further wherein at least one of the holder's data objects are holder-specific such that a particular call trigger event results in the rendering of a data object to the recipient that presents information that is specific to the holder.

22. The system of claim 18, wherein the user of the second communication device comprises a holder of multiple data objects and the user of the first communication device comprises a data object recipient, and further wherein at least one of the holder's data objects are recipient-specific such that a particular call trigger event results in the rendering of a data object to the recipient that presents information that is specific to the recipient.

23. The system of claim 18, wherein the first and/or second communication devices comprise mobile station devices.

24. The system of claim 18, wherein triggering communication event comprises an event pertaining to a call initiated by a user of the first communication device or a call initiated by a user of the second communication device.

25. The system of claim 18, wherein the data object comprises a variable portion and a non-variable portion, and wherein the logic for transferring in the data server and/or the logic for transferring in the second communication device is configured to transfer only the variable portion.

26. A system for supplying a data object to a user of a communication system, comprising:
a first communication device;
a second communication device;
wherein the first communication device and the second communication device are adapted to communicate via communication system for conducting voice communication;
a data server;
wherein the data server is couple to a data network;
wherein the data server includes;
(i) logic for creating a data object intended for rendering at the first communication device, the rendering to take place upon the occurrence of a triggering communication event, the triggering communication event comprising a call trigger event associated with a telephone connection between the first and second communication devices, the data object providing information pertaining to a user of the second communication device, the data object providing at least visual content upon being rendered;
(ii) a database;
(iii) logic for storing the data object in the database;
(iv) logic for transferring the data object from the data server to the first communication device;
wherein the first communication device includes:
(i) logic for determining whether a triggering communication event has occurred which will trigger the rendering of the transferred data object;
(ii) a rendering device; and
(iii) logic for rendering the data object on the rendering device upon the occurrence of the triggering communication event.

27. The system of claim 26, wherein the data object includes a trigger component which indicates the nature of the triggering communication event.

28. The system of claim 26, wherein the user of the second communication device comprises a holder of multiple data objects and the user of the first communication device comprises a data object recipient, and further wherein at least one of the holder's data objects are call trigger event-specific such that a particular call trigger event results in the rendering of the data object to the recipient that is specific to that call trigger event.

29. The system of claim 26, wherein the user of the second communication device comprises a holder of multiple data objects and the user of the first communication device comprises a data object recipient, and further wherein at least one of the holder's data objects are holder-specific such that a particular call trigger event results in the rendering of a data object to the recipient that presents information that is specific to the holder.

30. The system of claim 26, wherein the user of the second communication device comprises a holder of multiple data objects and the user of the first communication device comprises a data object recipient, and further wherein at least one of the holder's data objects are recipient-specific such that a particular call trigger event results in the rendering of a data object to the recipient that presents information that is specific to the recipient.

31. The system of claim 26, wherein the first and/or second communication devices comprise mobile station devices.

32. The system of claim 26, wherein triggering communication event comprises an event pertaining to a call initiated by a user of the first communication device or a call initiated by a user of the second communication device.

33. The system of claim 26, wherein the data object comprises a variable portion and a non-variable portion, and wherein the logic for transferring is configured to transfer only the variable portion to the first communication device.

34. The system of claim 26, further including a computer device, wherein the logic for transferring includes:
first logic for transferring the data object from the data server to the computer device; and
second logic for transferring the data object from the computer device to the first communication device.

35. A method for supplying a data object to a user of a communication system, the communication system providing voice communication between a first communication device and a second communication device, comprising the steps of:
servicing, at a data server, the creation of a data object intended for rendering at the first communication device, the rendering to take place upon the occurrence of a triggering communication event, the triggering communication event comprising a call trigger event associated with a telephone connection between the first communication device and a second communication devices, the data object providing information pertaining to a user of the second communication device, the data object providing at least visual content upon being rendered;

storing the data object in the data server;

transferring the data object from the data server to the first or second communication device before the occurrence of the triggering communication event; and wherein the data object is adapted such that upon a determination that the triggering communication event has occurred, the data object is rendered at the first communication device.

36. The method of claim 35, wherein the transferring step includes use a Short Message Service protocol to transfer the data object.

37. The method of claim 35, wherein the data object comprises a variable portion and a non-variable portion, and wherein the transferring step is configured to transfer only the variable portion.

38. A data server for supplying a data object to a user of a communication system, the communication system providing voice communication between a first communication device and a second communication device, the data server comprising:

logic for creating a data object intended for rendering at the first communication device, the rendering to take place upon the occurrence of a triggering communication event, the triggering communication event comprising a call trigger event associated with a telephone connection between the first communication device and a second communication device, the data object providing information pertaining to a user of the second communication device, the data object providing at least visual content upon being rendered;

a database;

logic for storing the data object in the database; and logic for transferring the data object from the data server to the first or second communication device before the occurrence of the triggering communication event; and wherein the data object is adapted such that upon a determination that the triggering communication event has occurred, the data object is rendered at the first communication device.

39. The data server of claim 38, wherein the logic for transferring in the data server includes use a Short Message Service protocol to transfer the data object.

40. The data server of claim 38, wherein the data object comprises a variable portion and a non-variable portion, and wherein the logic for transferring is configured to transfer only the variable portion.

41. A method for rendering a data object within a communication system, comprising the steps of:

receiving a data object at a first communication device, the rendering of which is to take place upon the occurrence of a triggering communication event, the triggering communication event comprising a call trigger event associated with a telephone connection between the first communication device and a second communication devices, the data object providing information pertaining to a user of a second communication device, the data object providing at least visual content upon being rendered;

storing the data object at the first communication device;

determining whether the triggering communication event has occurred; and rendering the data object at the first communication device upon the occurrence of the triggering communication event based upon a determination that the triggering communication event has occurred.

42. The method according to claim 41, wherein the data object is received via a Short Message Service protocol of the communication system.

43. A communication device for rendering a data object within a communication system, comprising:

logic for receiving a data object, the rendering of which is to take place upon the occurrence of a triggering communication event, the triggering communication event comprising a call trigger event associated with a telephone connection between a first communication device and a second communication devices, the data object providing information pertaining to a user of another communication device, the data object providing at least visual content upon being rendered;

logic for storing the data object;

logic for determining whether the triggering communication event has occurred; and logic for rendering the data object upon the occurrence of the triggering communication event based upon a determination that the triggering communication event has occurred.

44. The method of claim 35, wherein the user of the second communication device comprises a holder of multiple data objects and the user of the first communication device comprises a data object recipient, and further wherein at least one of the holder's data objects are call trigger event-specific such that a particular call trigger event results in the rendering of the data object to the recipient that is specific to that call trigger event.

45. The method of claim 35, wherein the user of the second communication device comprises a holder of multiple data objects and the user of the first communication device comprises a data object recipient, and further wherein at least one of the holder's data objects are holder-specific such that a particular call trigger event results in the rendering of a data object to the recipient that presents information that is specific to the holder.

46. The method of claim 35, wherein the user of the second communication device comprises a holder of multiple data objects and the user of the first communication device comprises a data object recipient, and further wherein at least one of the holder's data objects are recipient-specific such that a particular call trigger event results in the rendering of a data object to the recipient that presents information that is specific to the recipient.

47. The data server of claim 38, wherein the user of the second communication device comprises a holder of multiple data objects and the user of the first communication device comprises a data object recipient, and further wherein at least one of the holder's data objects are call trigger event-specific such that a particular call trigger event results in the rendering of the data object to the recipient that is specific to that call trigger event.

48. The data server of claim 38, wherein the user of the second communication device comprises a holder of multiple data objects and the user of the first communication device comprises a data object recipient, and further wherein at least one of the holder's data objects are holder-specific such that a particular call trigger event results in the rendering of a data object to the recipient that presents information that is specific to the holder.

49. The data server of claim 38, wherein the user of the second communication device comprises a holder of multiple data objects and the user of the first communication device comprises a data object recipient, and further wherein at least one of the holder's data objects are recipient-specific such that a particular call trigger event results in the rendering of a data object to the recipient that presents information that is specific to the recipient.

50. The method of claim 41, wherein the user of the second communication device comprises a holder of multiple data objects and the user of the first communication device comprises a data object recipient, and further wherein at least one of the holder's data objects are call trigger event-specific such that a particular call trigger event results in the rendering of the data object to the recipient that is specific to that call trigger event.

51. The method of claim 41, wherein the user of the second communication device comprises a holder of multiple data objects and the user of the first communication device comprises a data object recipient, and further wherein at least one of the holder's data objects are holder-specific such that a particular call trigger event results in the rendering of a data object to the recipient that presents information that is specific to the holder.

52. The method of claim 41, wherein the user of the second communication device comprises a holder of multiple data objects and the user of the first communication device comprises a data object recipient, and further wherein at least one of the holder's data objects are recipient-specific such that a particular call trigger event results in the rendering of a data object to the recipient that presents information that is specific to the recipient.

53. The communication device of claim 43, wherein a user of a second communication device comprises a holder of multiple data objects and a user of a first communication device comprises a data object recipient, and further wherein at least one of the holder's data objects are call trigger event-specific such that a particular call trigger event results in the rendering of the data object to the recipient that is specific to that call trigger event.

54. The communication device of claim 43, wherein a user of a second communication device comprises a holder of multiple data objects and a user of a first communication device comprises a data object recipient, and further wherein at least one of the holder's data objects are holder-specific such that a particular call trigger event results in the rendering of a data object to the recipient that presents information that is specific to the holder.

55. The communication device of claim 43, wherein a user of a second communication device comprises a holder of multiple data objects and a user of a first communication device comprises a data object recipient, and further wherein at least one of the holder's data objects are recipient-specific such that a particular call trigger event results in the rendering of a data object to the recipient that presents information that is specific to the recipient.

\* \* \* \* \*